US010743014B2

(12) United States Patent
Keinert et al.

(10) Patent No.: US 10,743,014 B2
(45) Date of Patent: Aug. 11, 2020

(54) BIT-PLANE CODING

(71) Applicant: Fraunhofer-Gesellschaft zur Foerderung der angewandten Forschung e.V., Munich (DE)

(72) Inventors: Joachim Keinert, Nuremberg (DE); Thomas Richter, Berlin (DE); Miguel Ángel Martínez Del Amor, La Algaba (ES); Manuel De Frutos López, Nuremberg (DE); Christian Scherl, Uttenreuth (DE); Herbert Thoma, Erlangen (DE); Siegfried Foessel, Erlangen (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 202 days.

(21) Appl. No.: 16/031,227

(22) Filed: Jul. 10, 2018

(65) Prior Publication Data

US 2019/0045206 A1 Feb. 7, 2019

Related U.S. Application Data

(63) Continuation of application No. PCT/EP2018/056122, filed on Mar. 12, 2018.

(30) Foreign Application Priority Data

Jul. 10, 2017 (EP) .................................. 17180617

(51) Int. Cl.
*H04N 19/44* (2014.01)
*H04N 19/70* (2014.01)
(Continued)

(52) U.S. Cl.
CPC ............. *H04N 19/45* (2014.11); *H04N 19/18* (2014.11); *H04N 19/1883* (2014.11);
(Continued)

(58) Field of Classification Search
CPC .... H04N 19/61; H04N 19/103; H04N 19/105; H04N 19/50; H04N 19/45; H04N 19/70; H04N 19/18; H04N 19/625; H04N 19/645
See application file for complete search history.

(56) References Cited

U.S. PATENT DOCUMENTS

| 9,332,258 B2 | 5/2016 | Pellegrin et al. |
| 2009/0110066 A1* | 4/2009 | Wang .................... H04N 19/13 375/240.12 |
| 2013/0016780 A1* | 1/2013 | Oh ......................... H04N 19/44 375/240.12 |

FOREIGN PATENT DOCUMENTS

| EP | 2773122 A1 | 9/2014 |
| WO | 2018041840 A1 | 3/2018 |

OTHER PUBLICATIONS

Intopix, "intoPIX Codec Submission for JPEG-XS CfP", Design Description, V0.1, XP030190195, Sep. 23, 2016, pp. 1-46.
(Continued)

*Primary Examiner* — Kenny A Cese
(74) *Attorney, Agent, or Firm* — Michael A. Glenn; Perkins Coie LLP

(57) ABSTRACT

A coding efficiency improvement is achieved by performing bit-plane coding in a manner so that coefficient groups for which the set of coded bit-planes is predictively signaled in the datastream, are grouped in two group sets and if a signal is spent in the datastream which signals, for a group set, whether the set of coded bit-planes of all coefficient groups of the respective group set are empty, i.e. all coefficients within the respective group sets are insignificant. In accor-
(Continued)

dance with another aspect, a coding efficiency improvement is achieved by providing bit-plane coding with group-set-wise insignificant signalization according to the first aspect as a coding option alternative relative to the signalization for group sets for which it is signaled that there is no coded prediction residual for the coded bit-planes for the claim groups within the respective group set.

14 Claims, 34 Drawing Sheets

(51) Int. Cl.
| | |
|---|---|
| *H04N 19/18* | (2014.01) |
| *H04N 19/169* | (2014.01) |
| *H04N 19/61* | (2014.01) |
| *H04N 19/625* | (2014.01) |
| *H04N 19/645* | (2014.01) |
| *H04N 19/593* | (2014.01) |
| *H04N 19/132* | (2014.01) |

(52) U.S. Cl.
CPC ......... *H04N 19/61* (2014.11); *H04N 19/625* (2014.11); *H04N 19/645* (2014.11); *H04N 19/70* (2014.11); *H04N 19/132* (2014.11); *H04N 19/593* (2014.11)

(56) References Cited

OTHER PUBLICATIONS

Jiao, R., et al., "A Low Complexity Image Coding Algorithm Based on Wavelet Prediction and Zero-block Scanning", Apr. 26, 2006, 4 pages.

Kim, Jaemoon, et al., "A Lossless Embedded Compression Using Significant Bit Truncation for HD Video Coding", IEEE Transactions on Circuits and Systems for Video Technology, 2010, vol. 20, No. 6, pp. 848-860.

Kojima, Toshiaki, "LLVC—Low Latency Video Codec for Network Transfer", SMPTE RDD 34:2015, 2015, pp. 1-32.

Lorent, Jean-Baptiste, "TICO Lightweight Codec Used in IP Networked or in SDI Infrastructures", SMPTE Registered Disclosure Document, 35:2016, 2016, pp. 1-53.

Text of ISO/IEC, "text of ISO/IEC 21122 WD (JPEG XS) v2.8", Coding and Analysis subgroup, 75th Meeting, Mar. 2017, Editors: Richter et al., Project: ISO/IEC 21122 (JPEG XS), Information Technology—JPEG XS Low-Latency Lighweight Image Coding System, no. wgIm75019, XP030190371, Jun. 19, 2017, 64 pages.

* cited by examiner

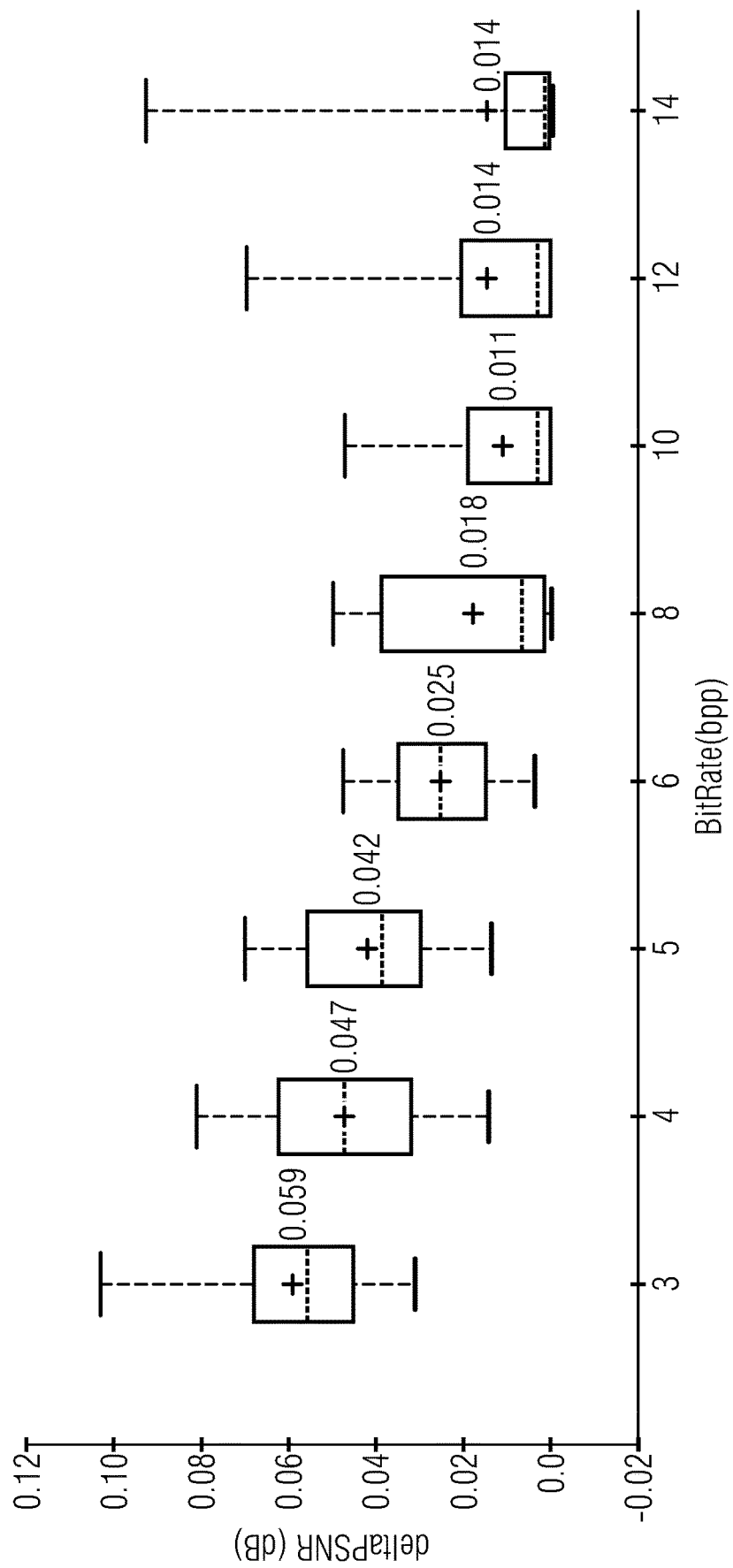
Fig. 6.1

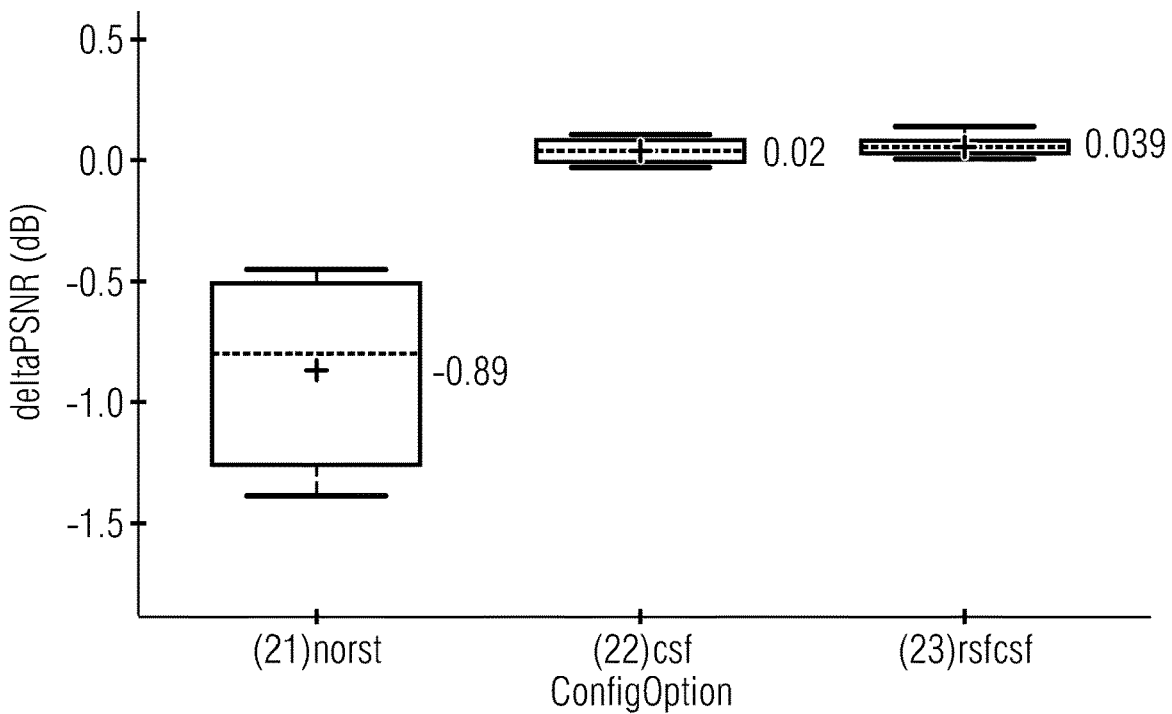
Fig. 6.2
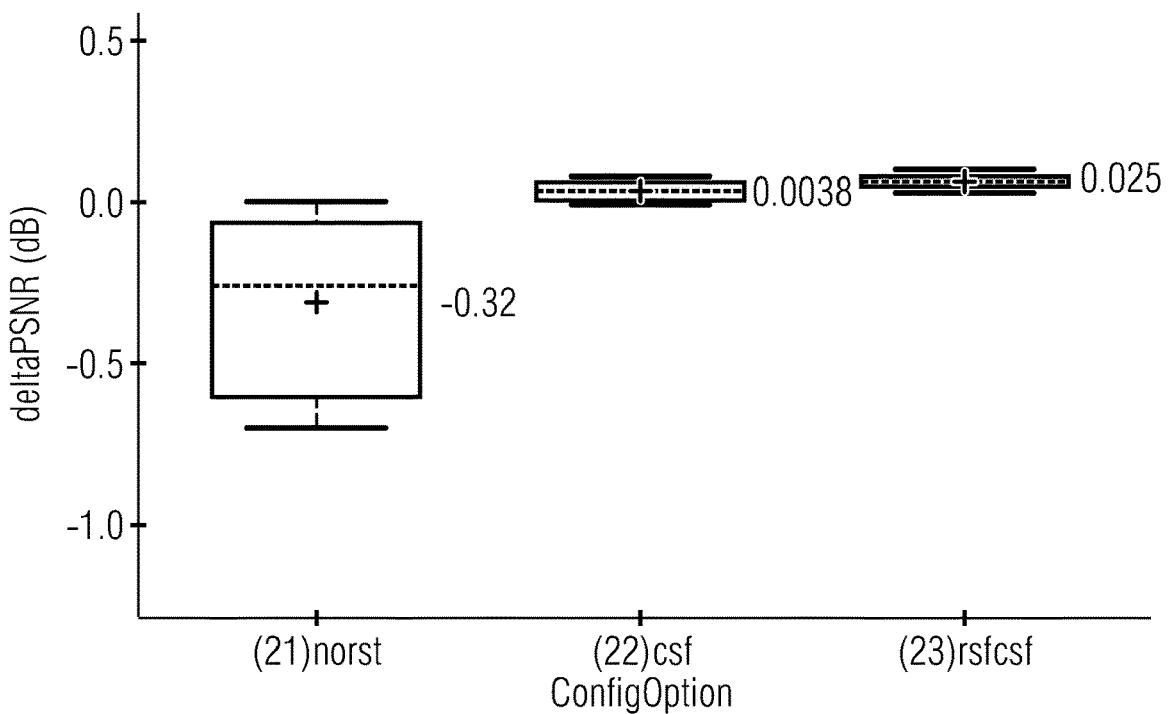
Fig. 6.3

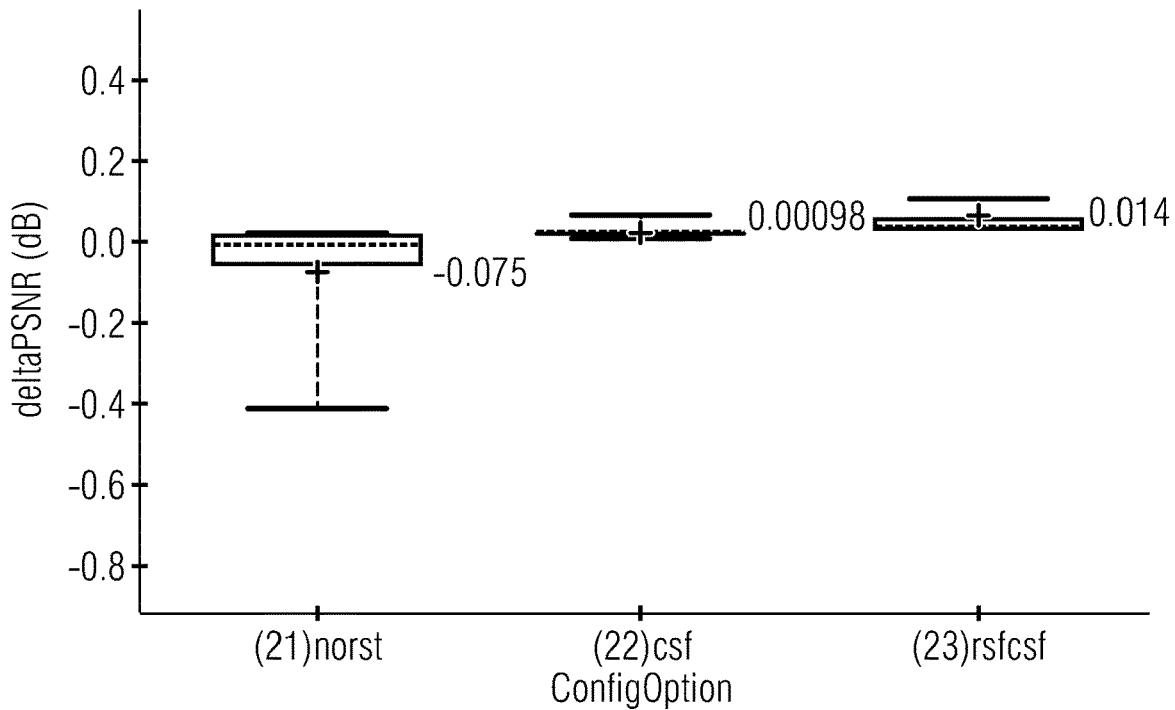
Fig. 6.4
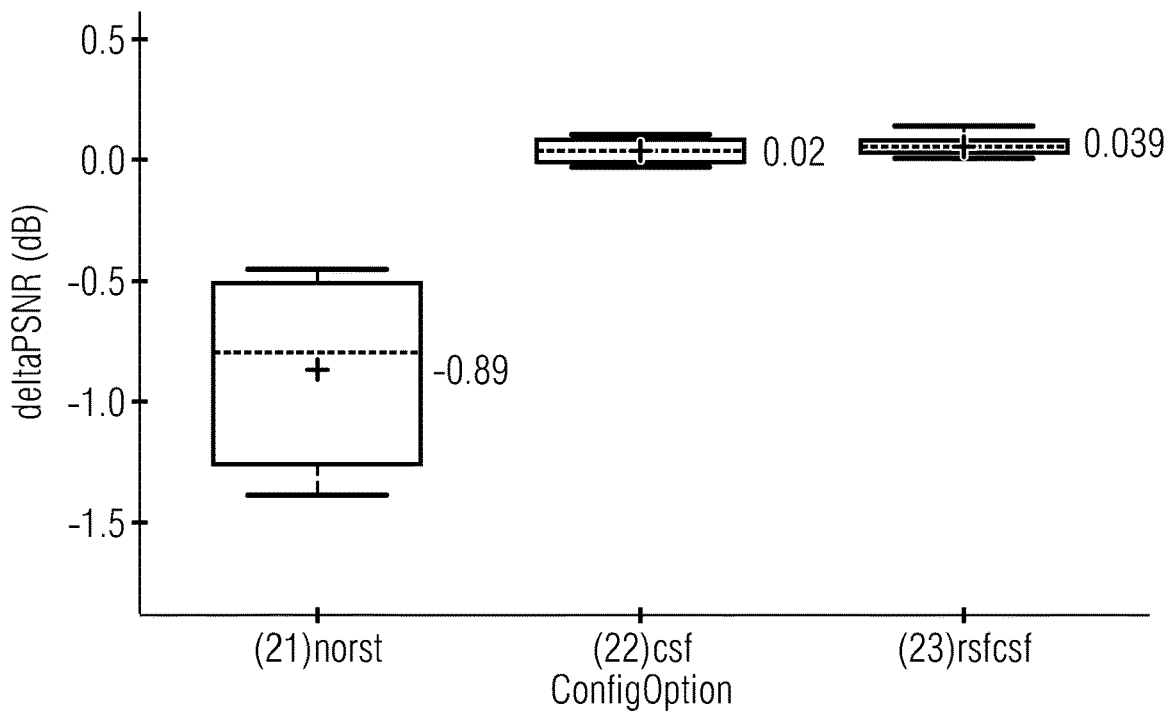
Fig. 6.5

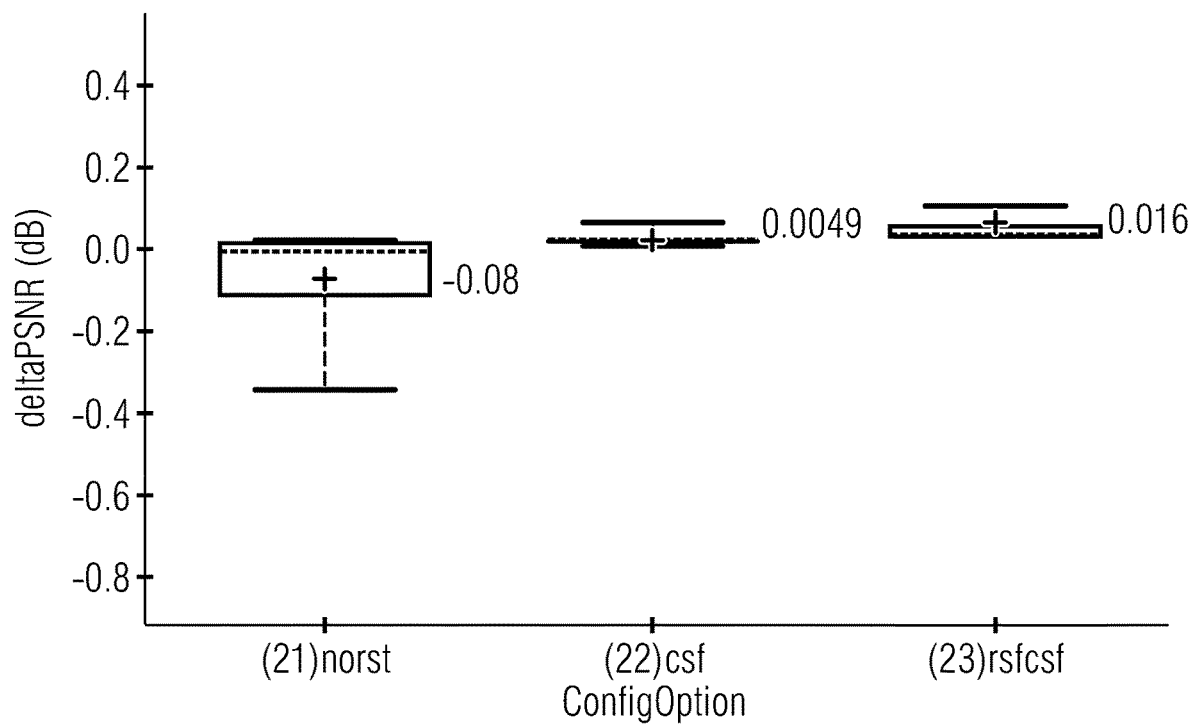
Fig. 6.6

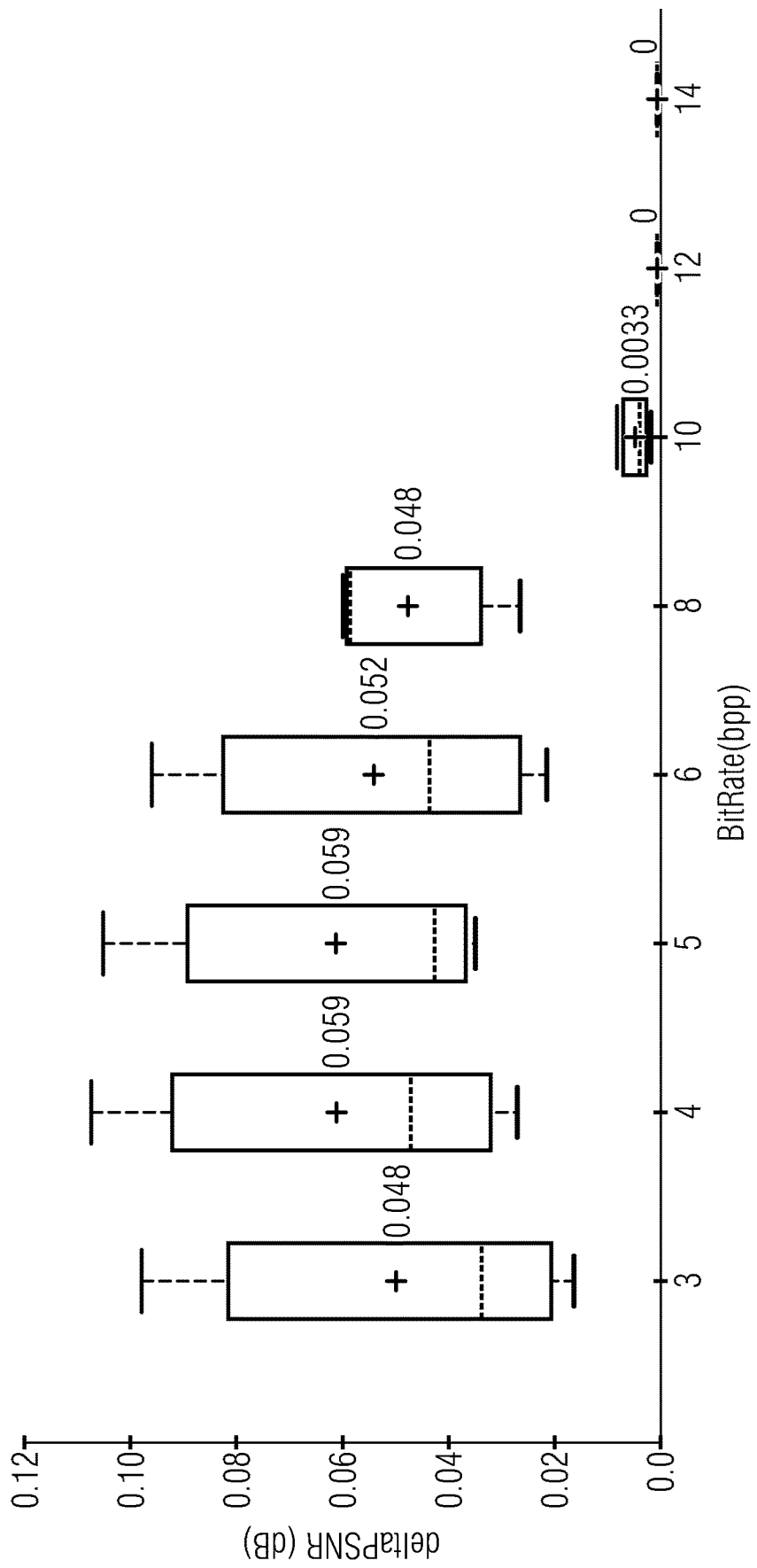
Fig. 6.7

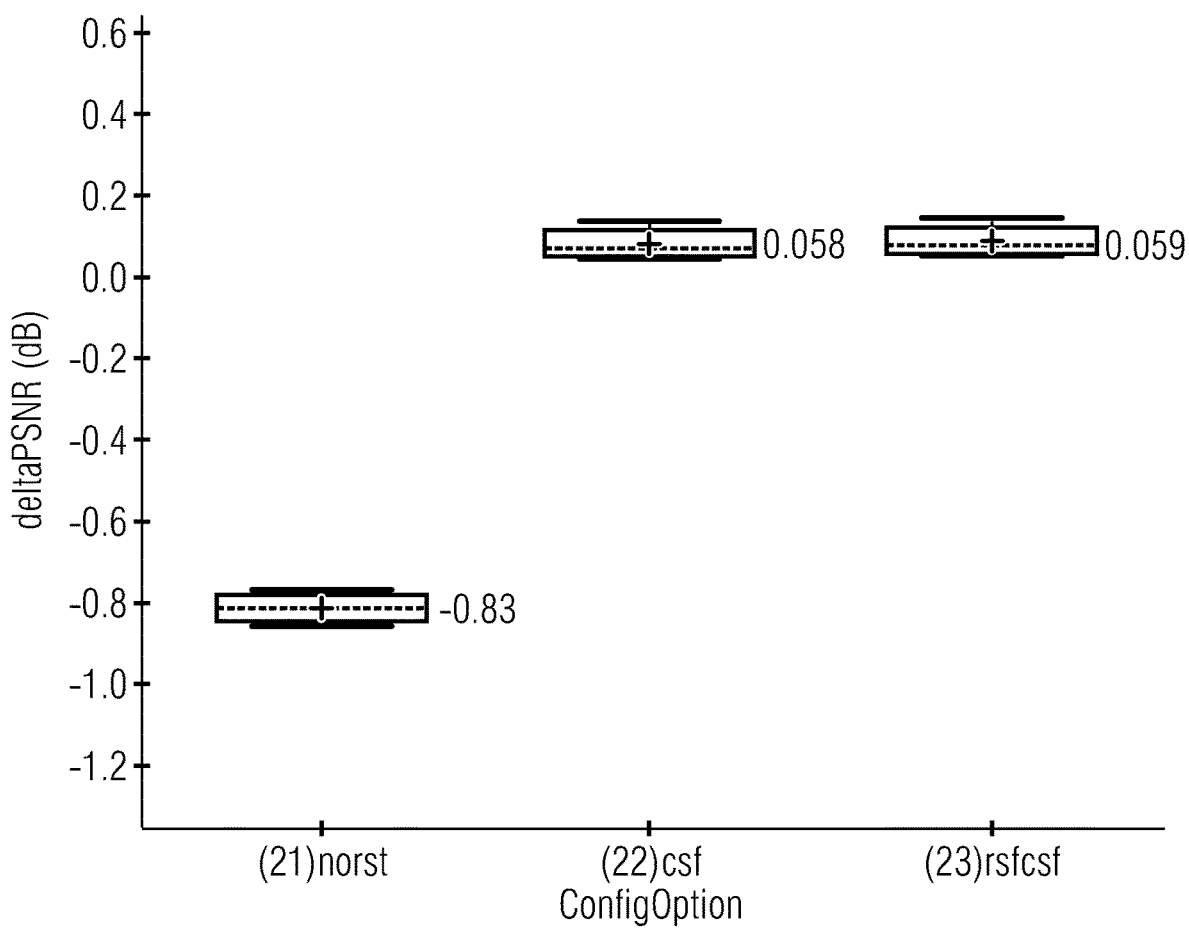
Fig. 6.8

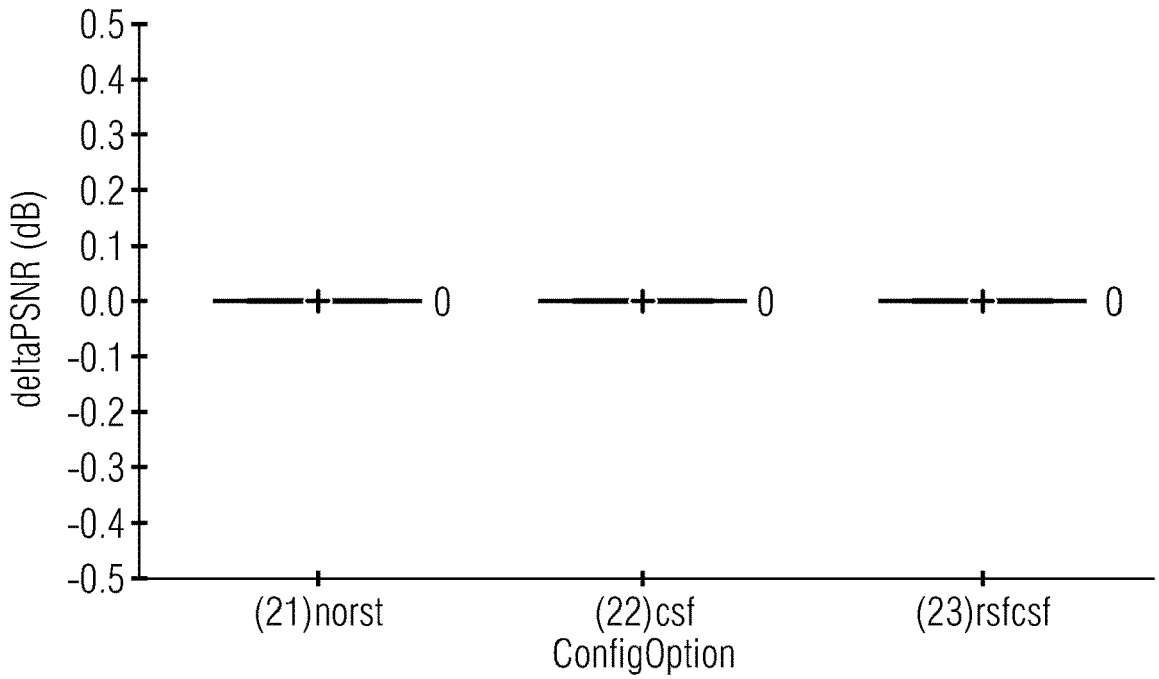
Fig. 6.9
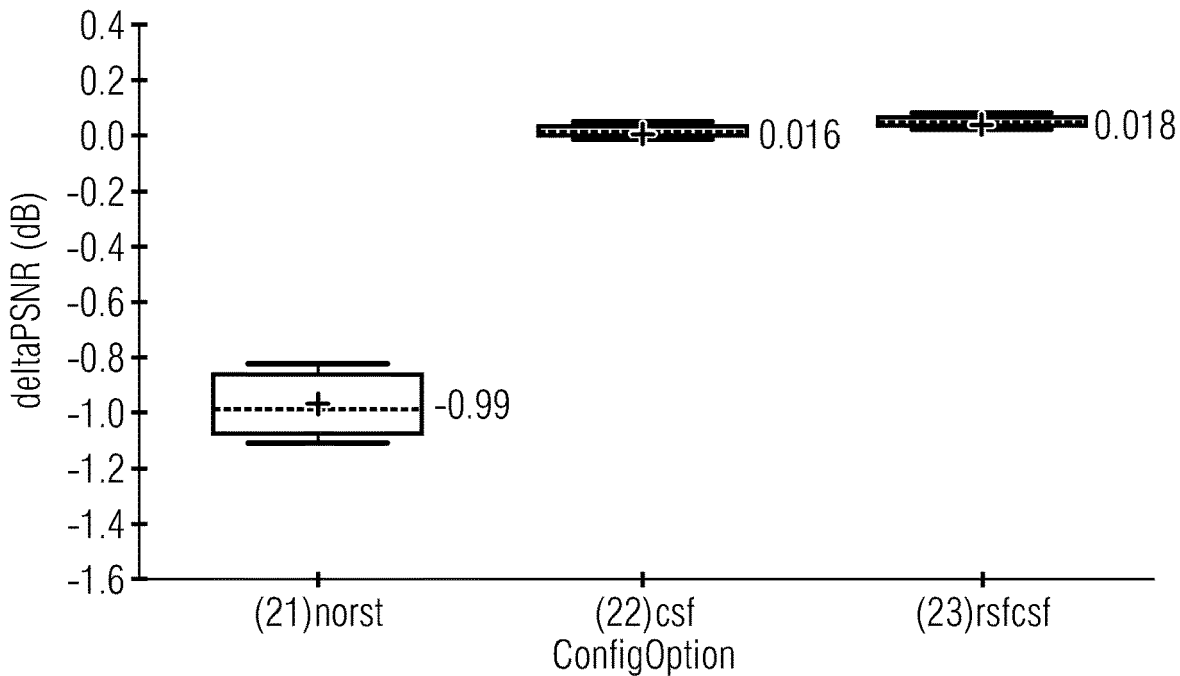
Fig. 6.10

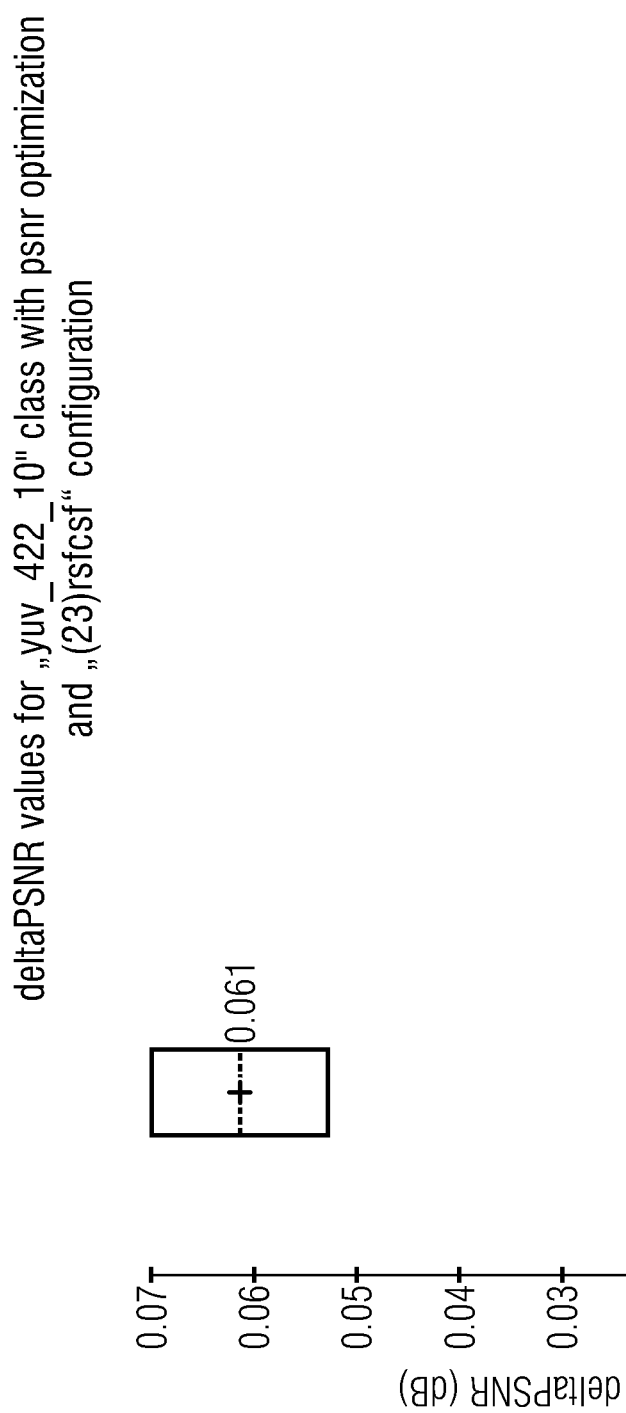
Fig. 6.11

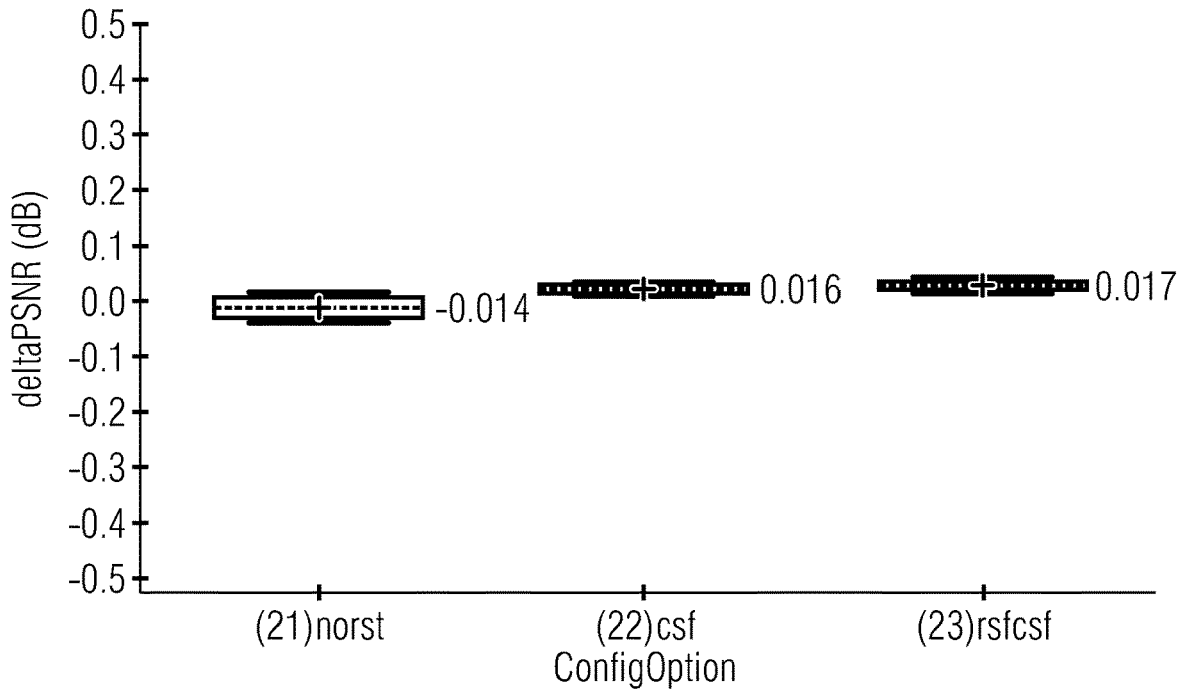
Fig. 6.12
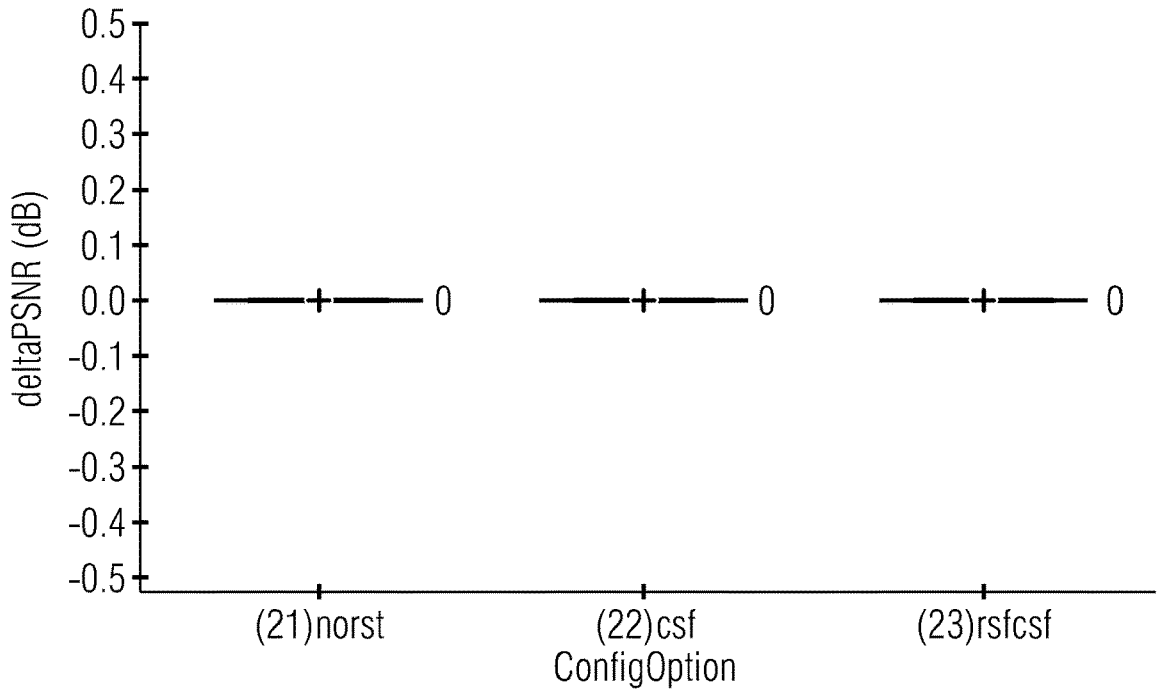
Fig. 6.13

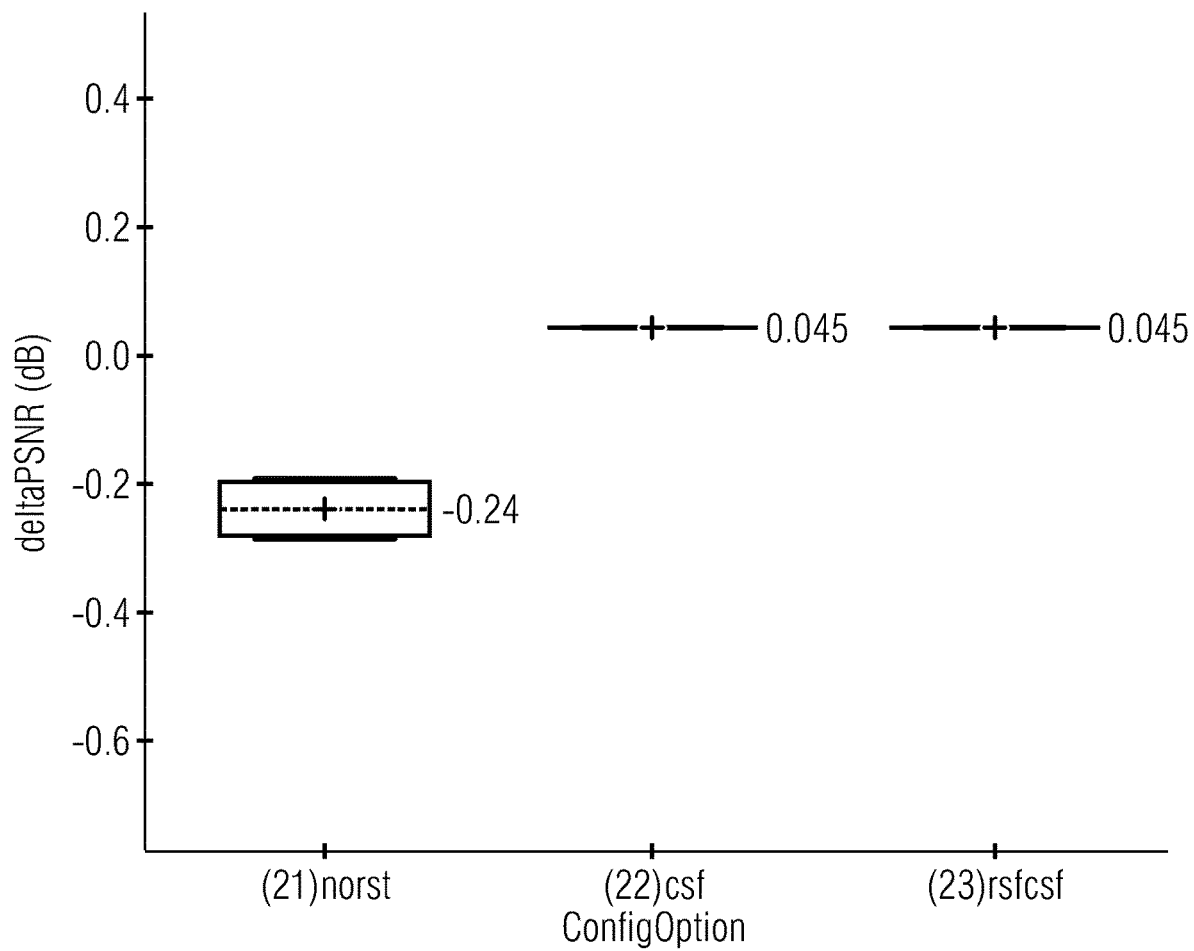
Fig. 6.14

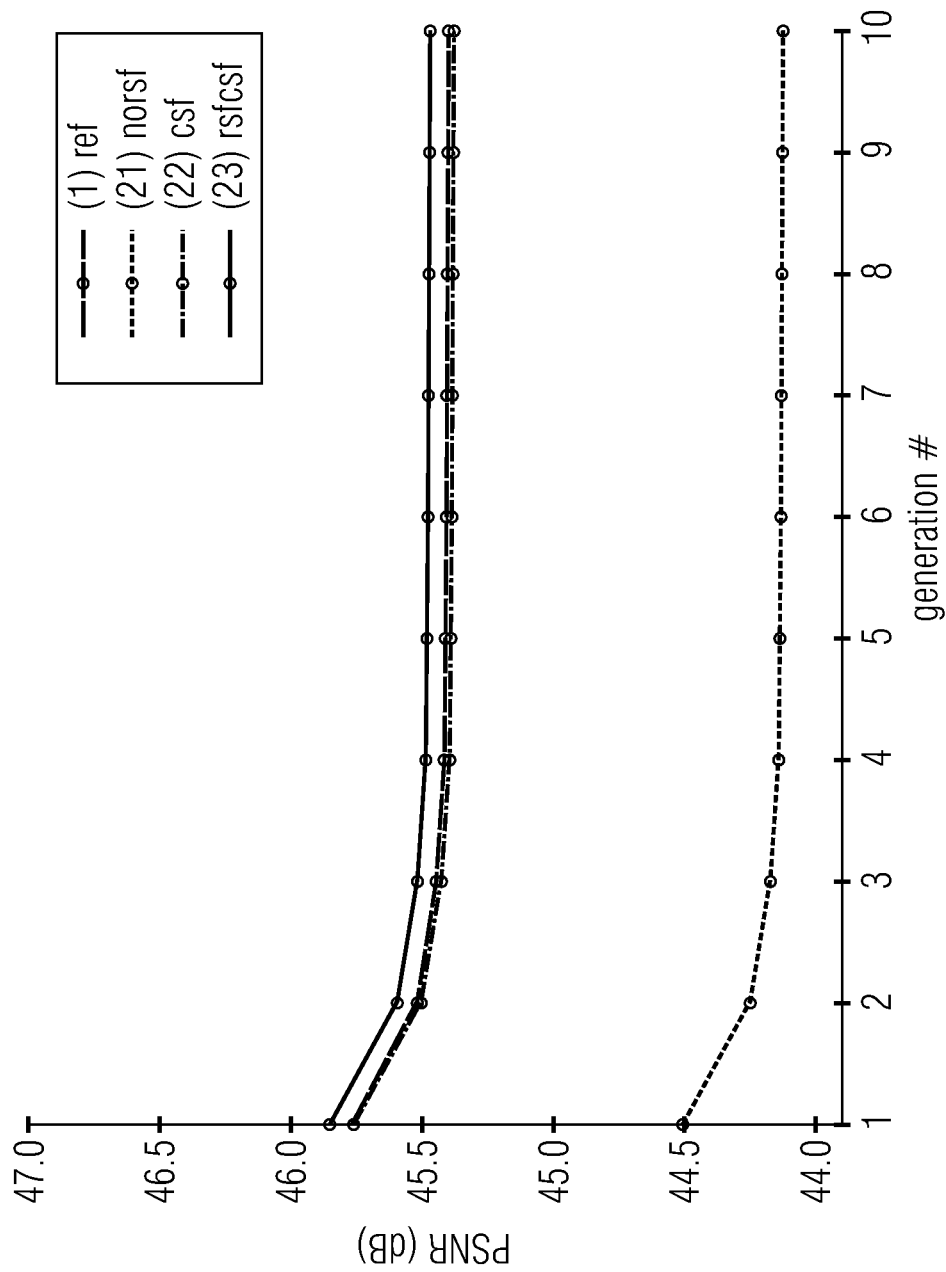
Fig. 6.15

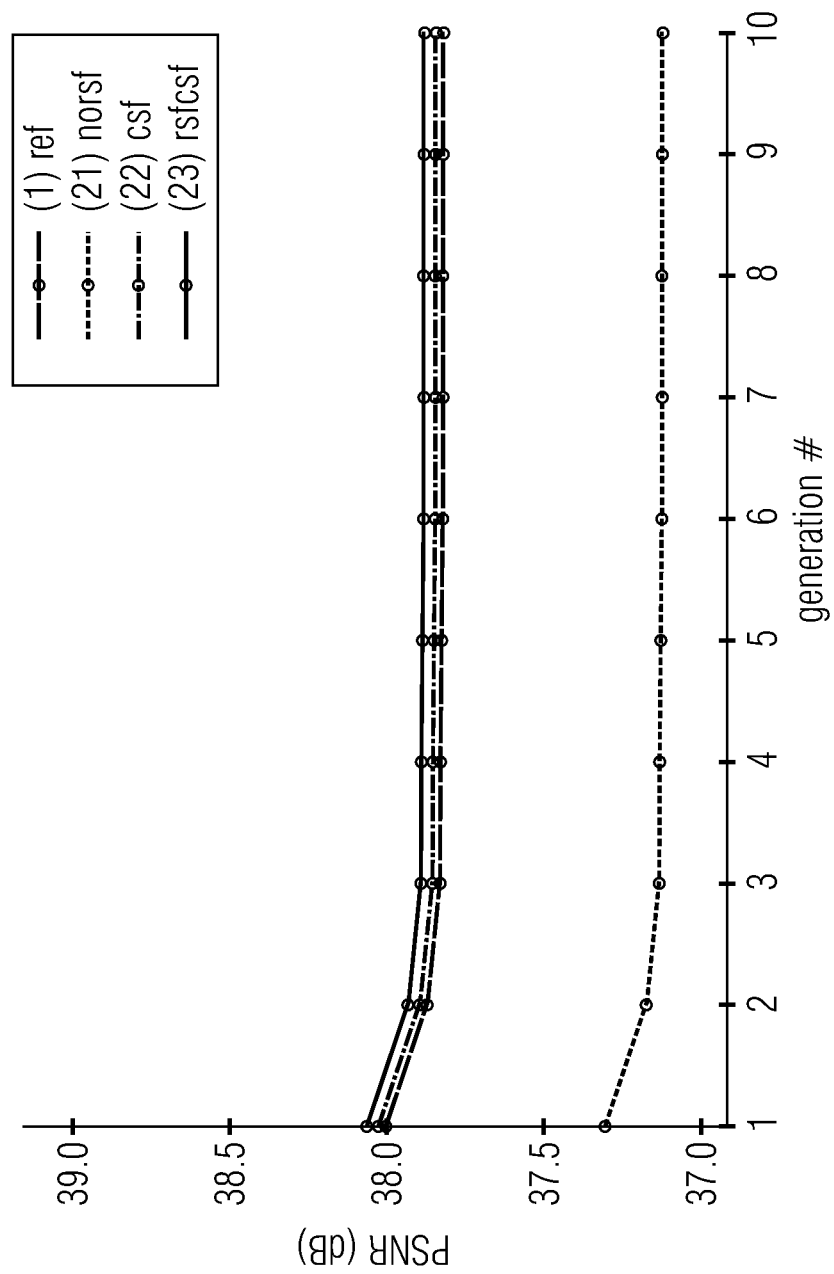
Fig. 6.16

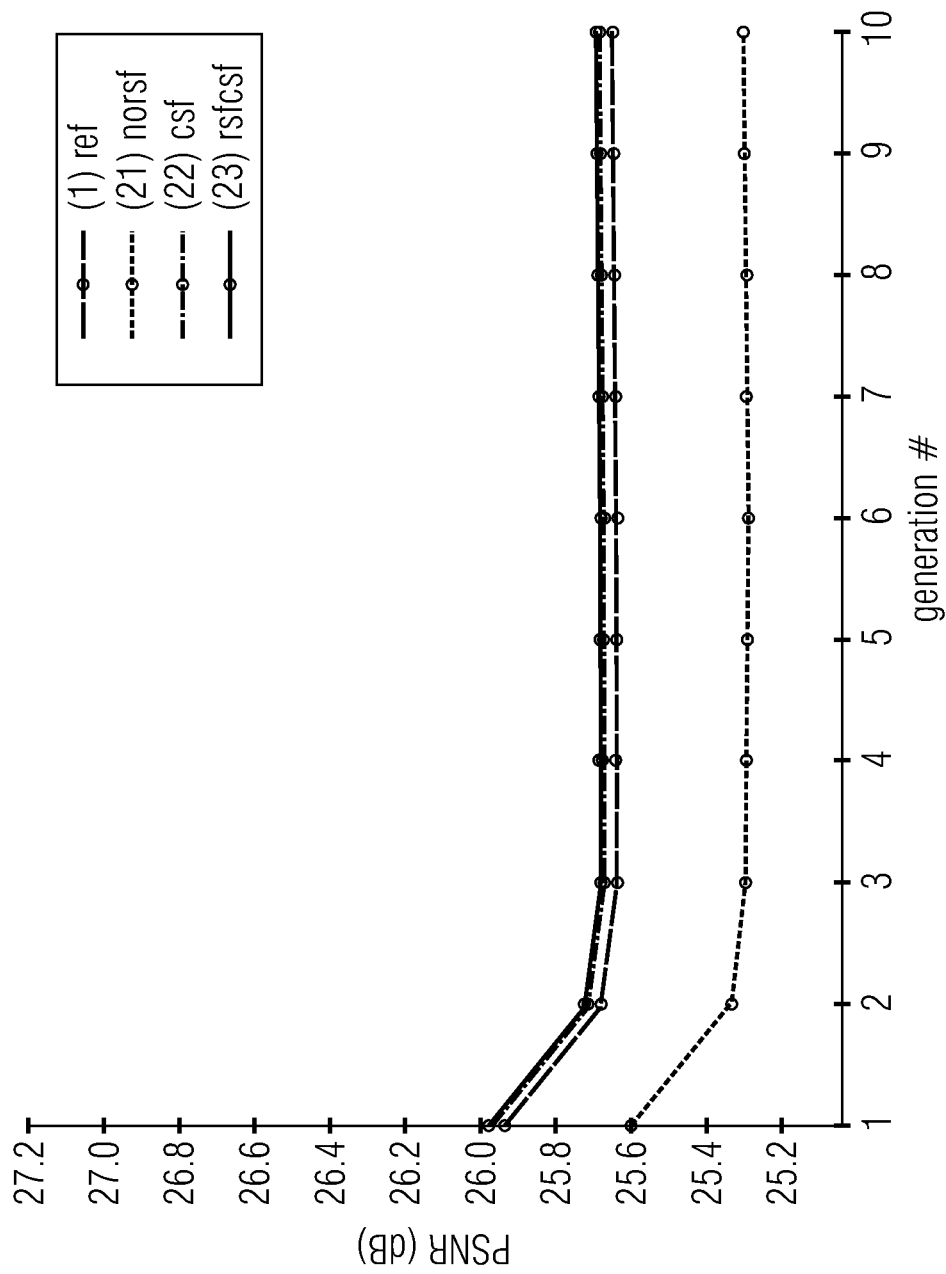
Fig. 6.17

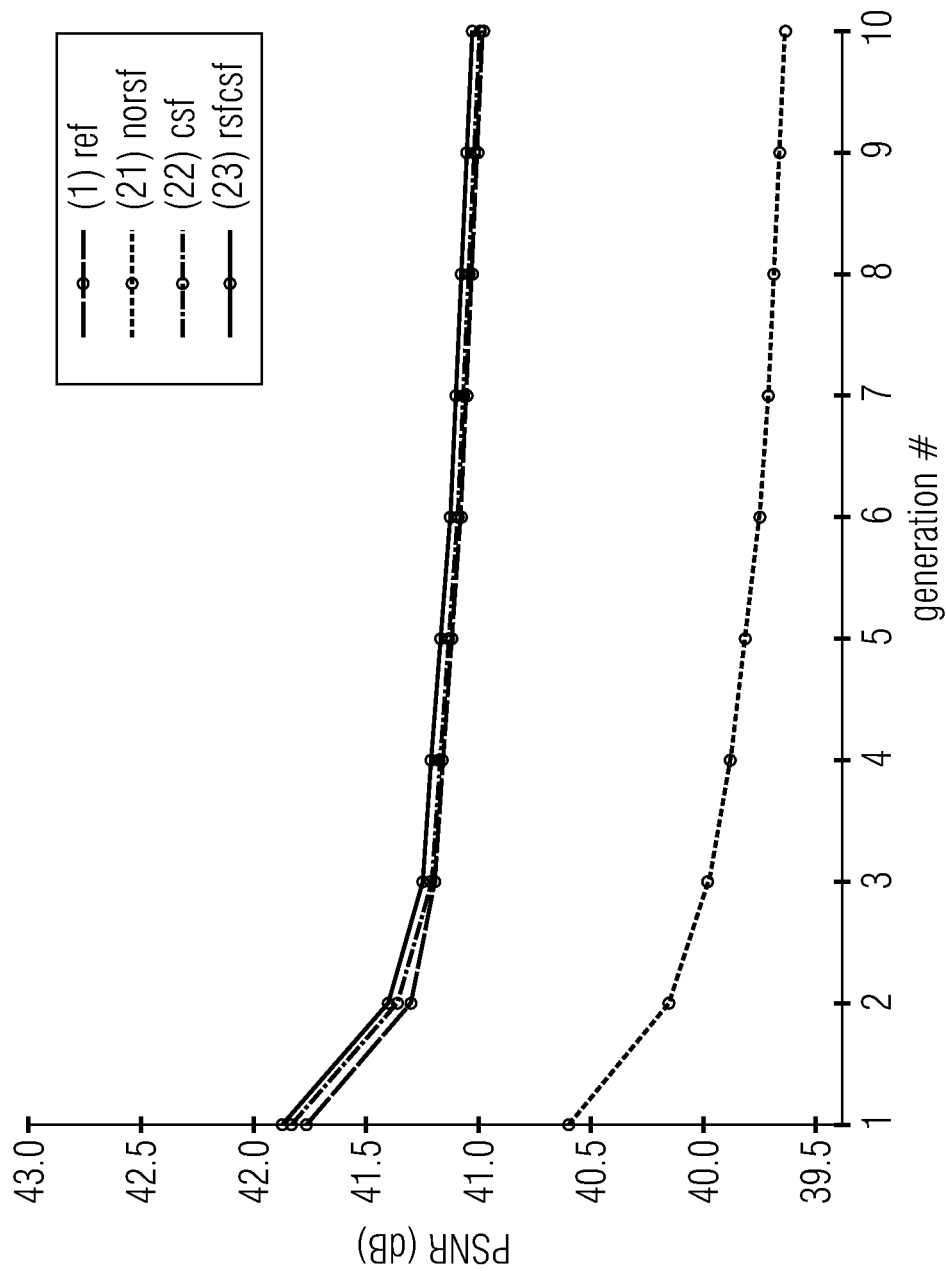
Fig. 6.18

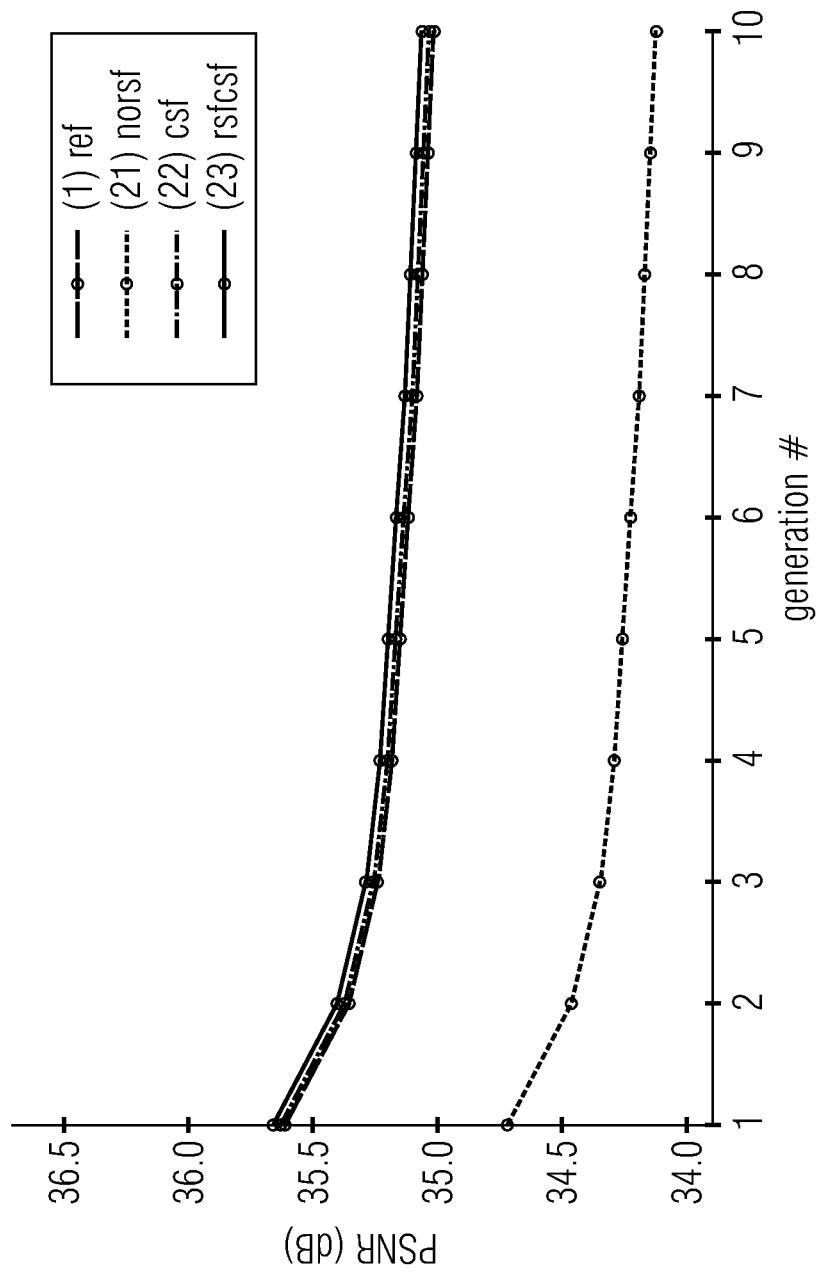
Fig. 6.19

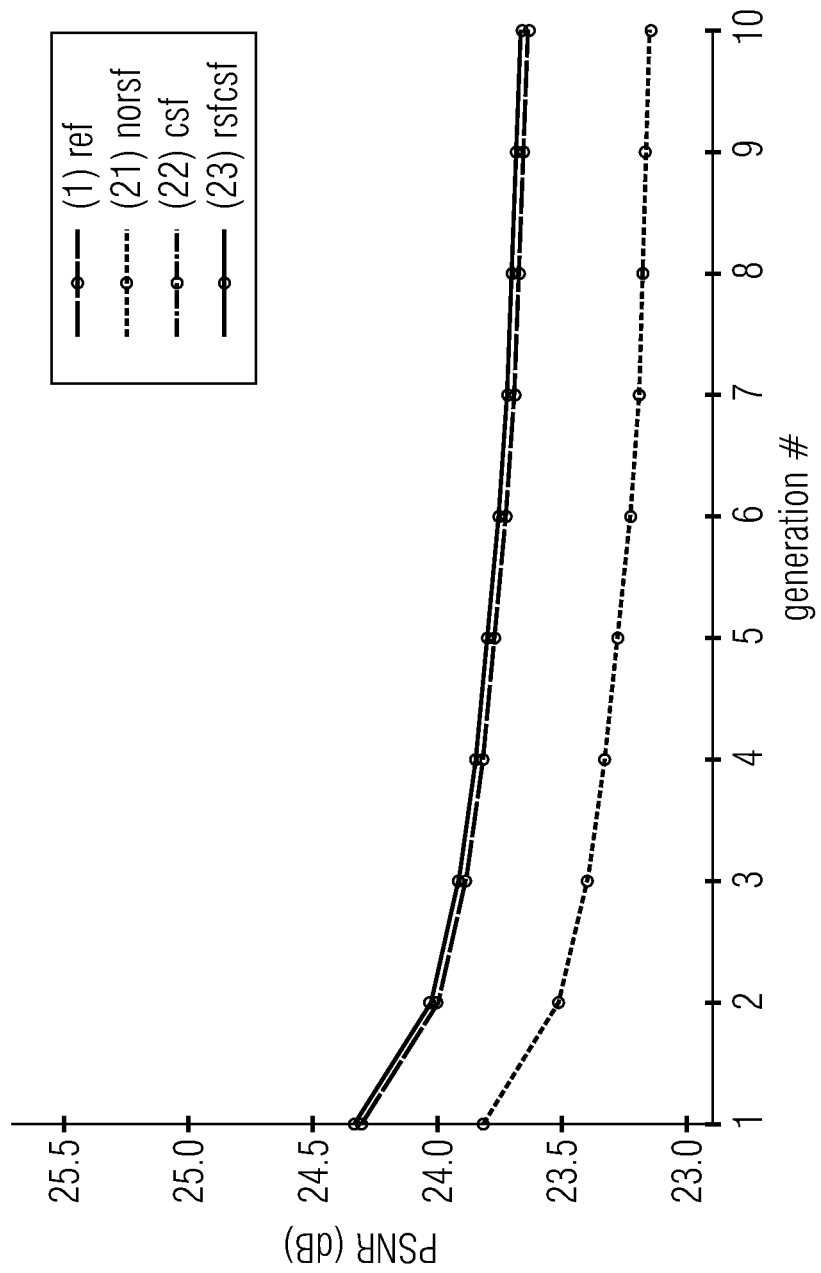
Fig. 6.20

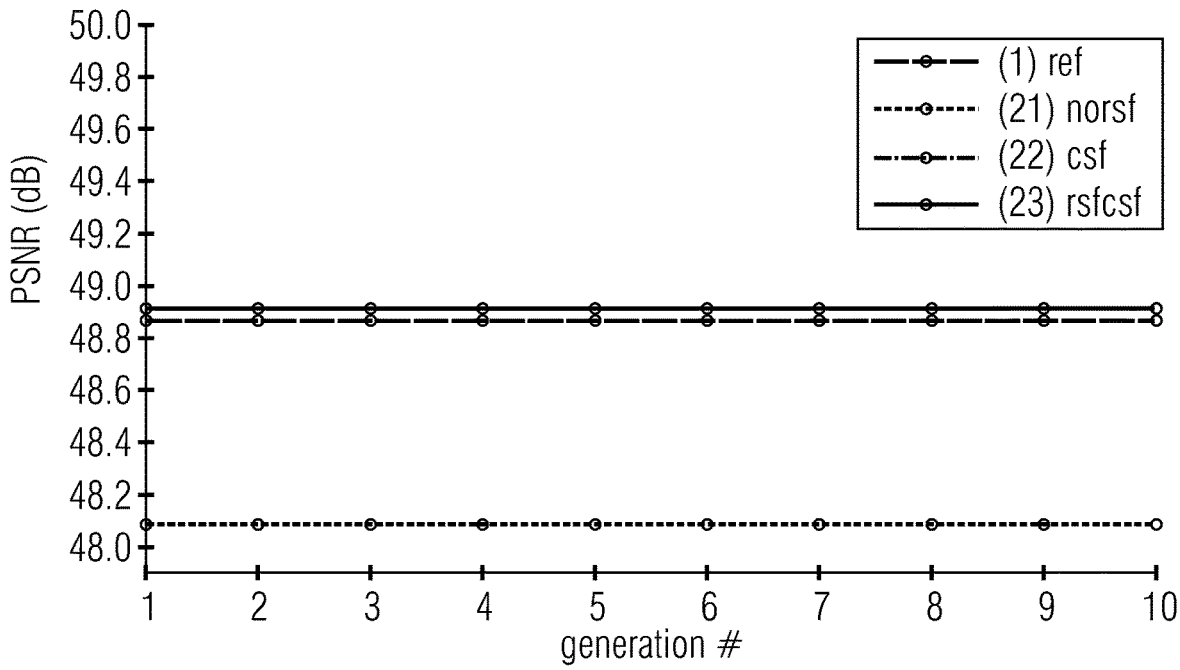
Fig. 6.21
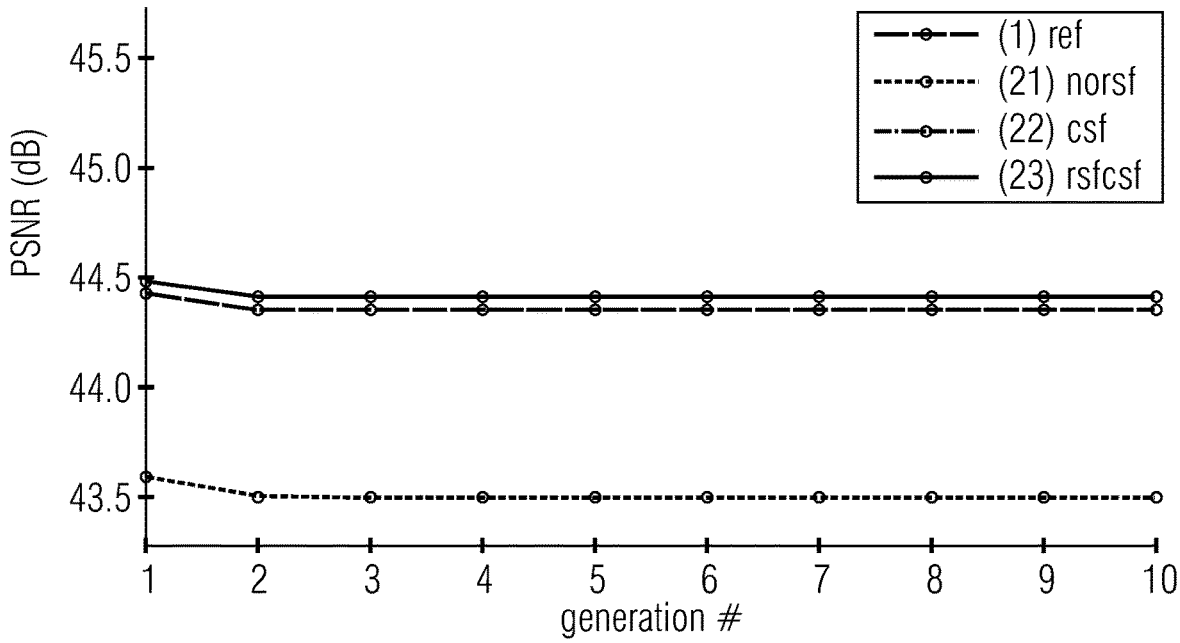
Fig. 6.22

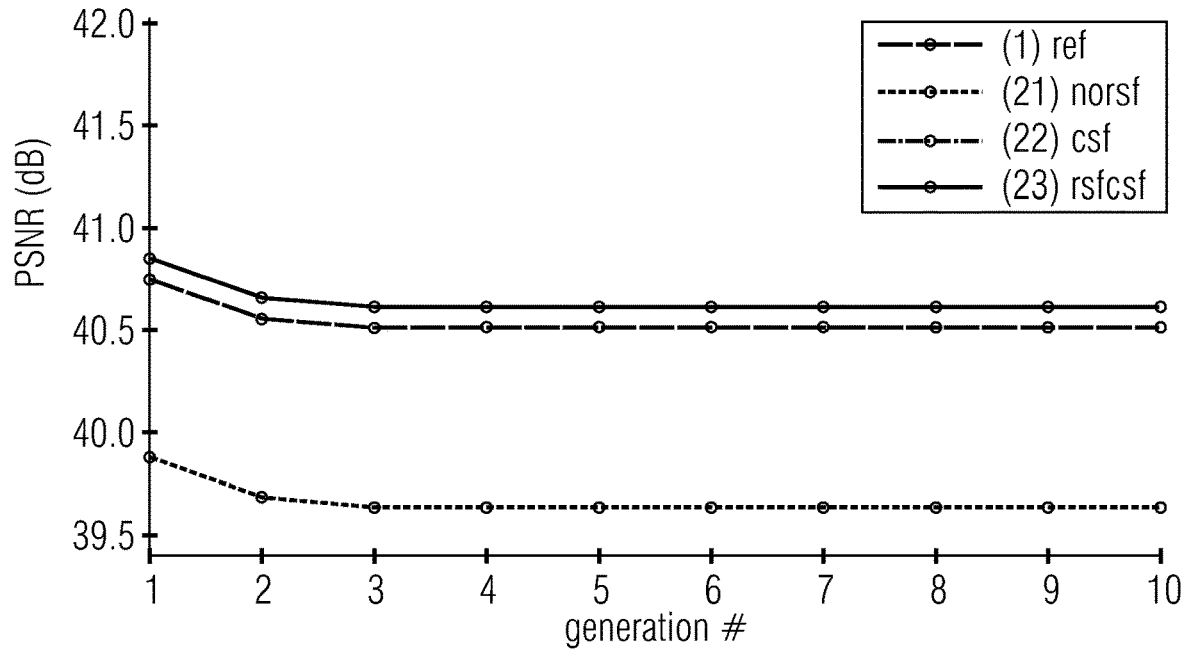
Fig. 6.23
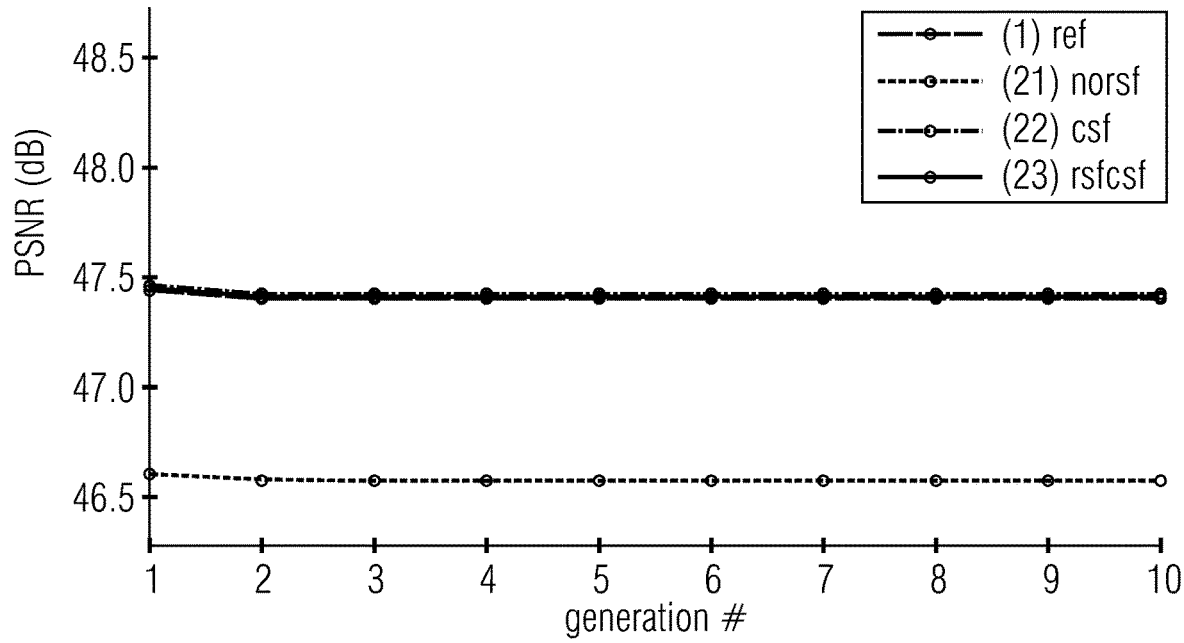
Fig. 6.24

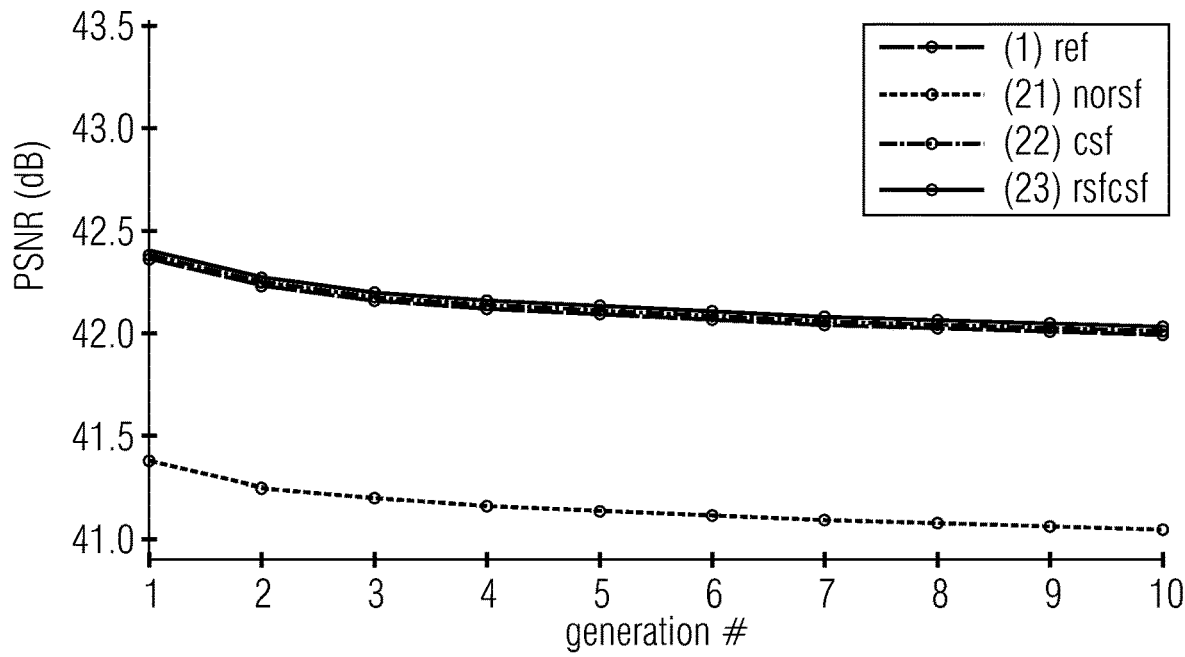
Fig. 6.25
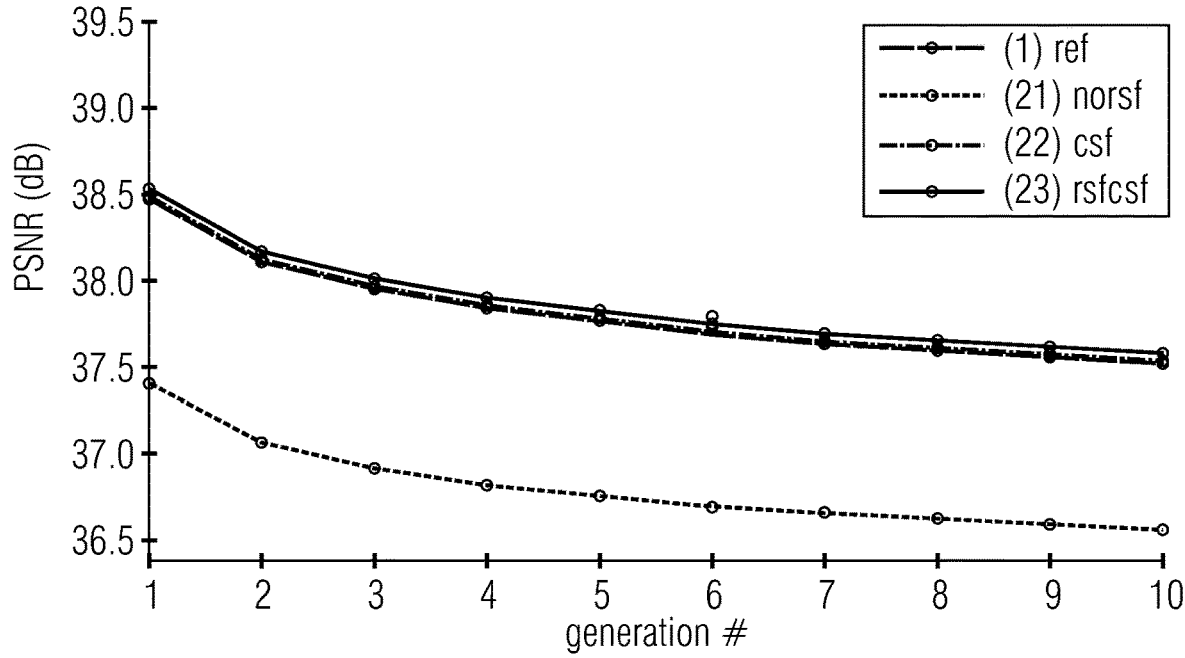
Fig. 6.26

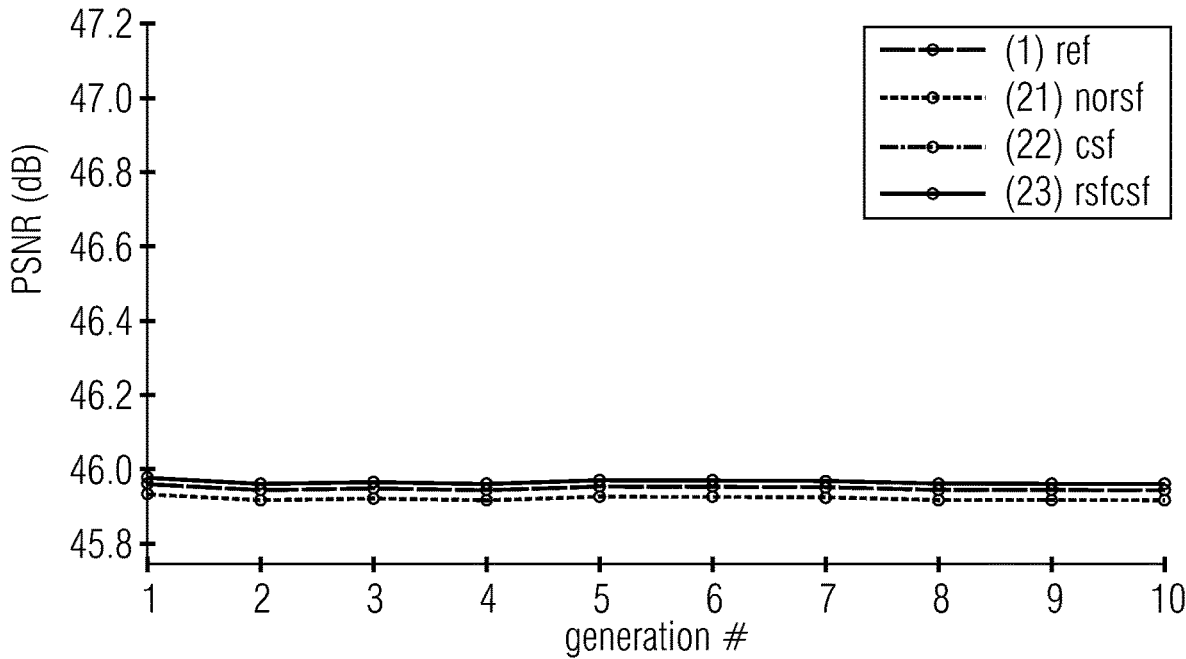
Fig. 6.27
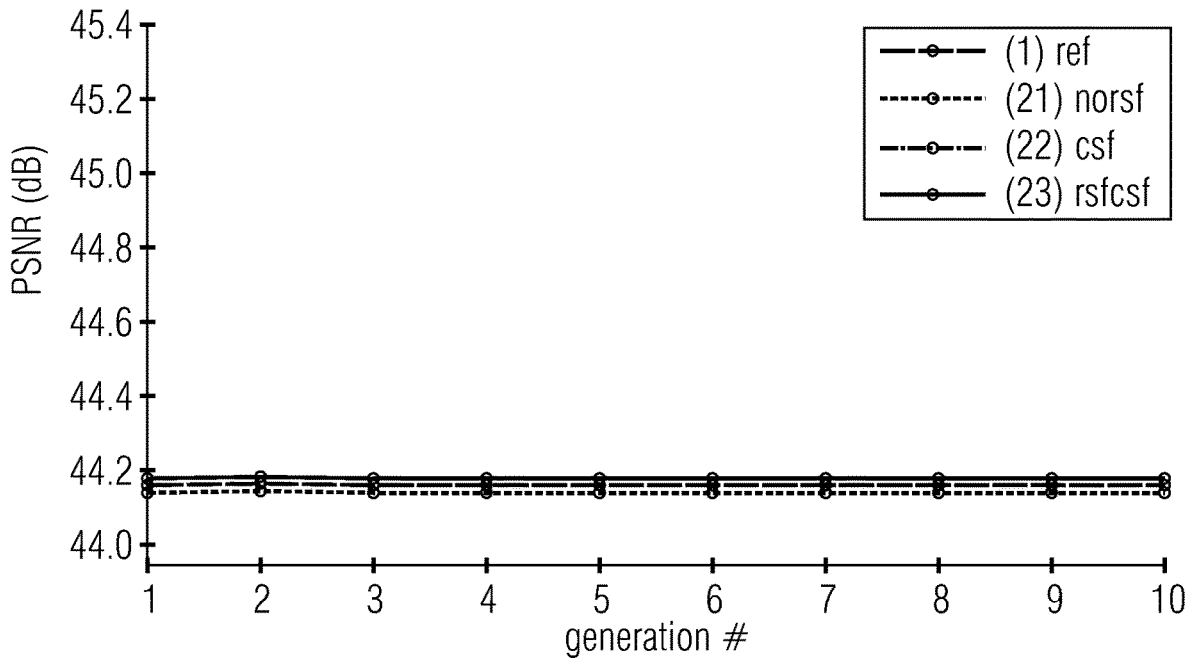
Fig. 6.28

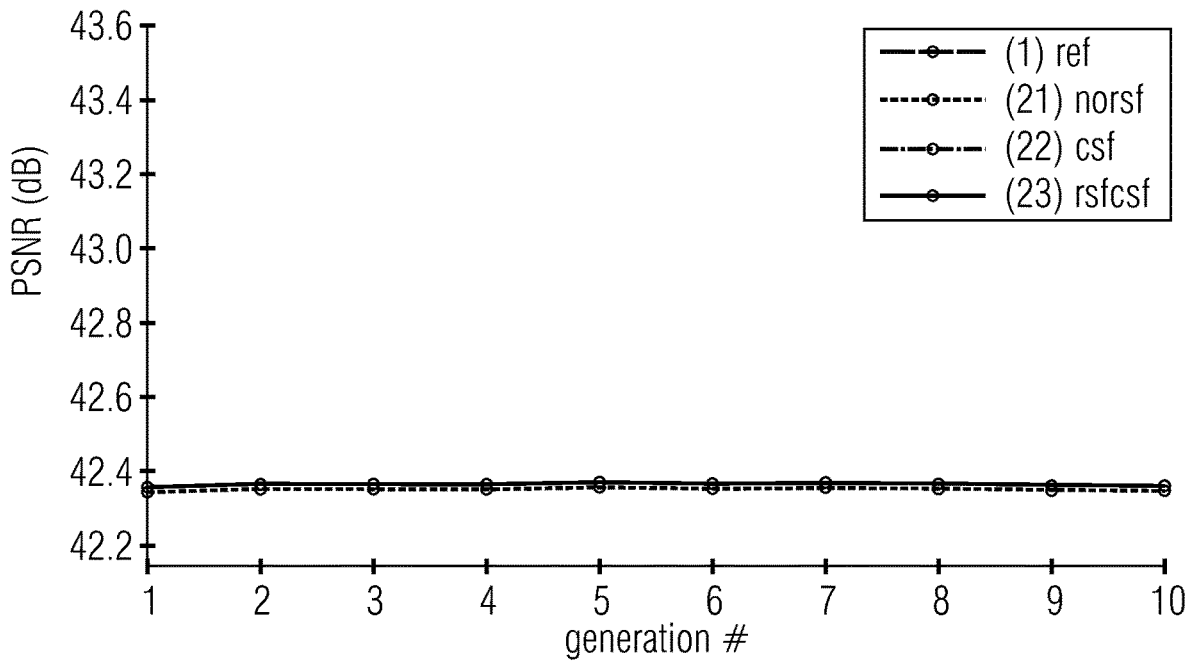
Fig. 6.29
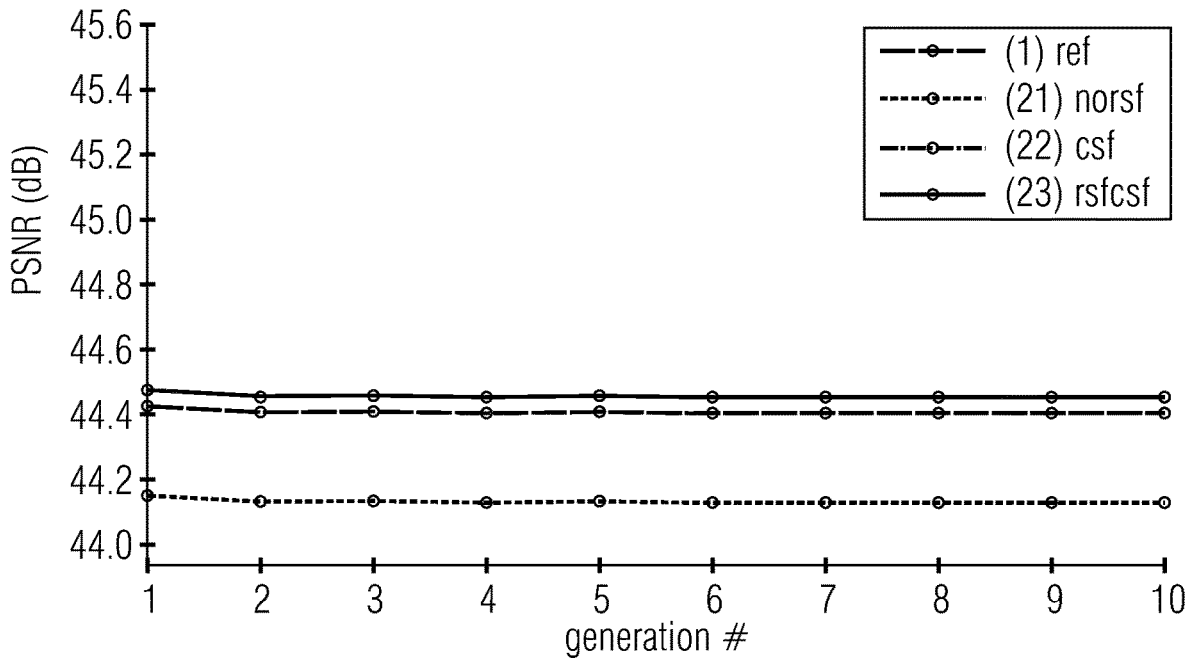
Fig. 6.30

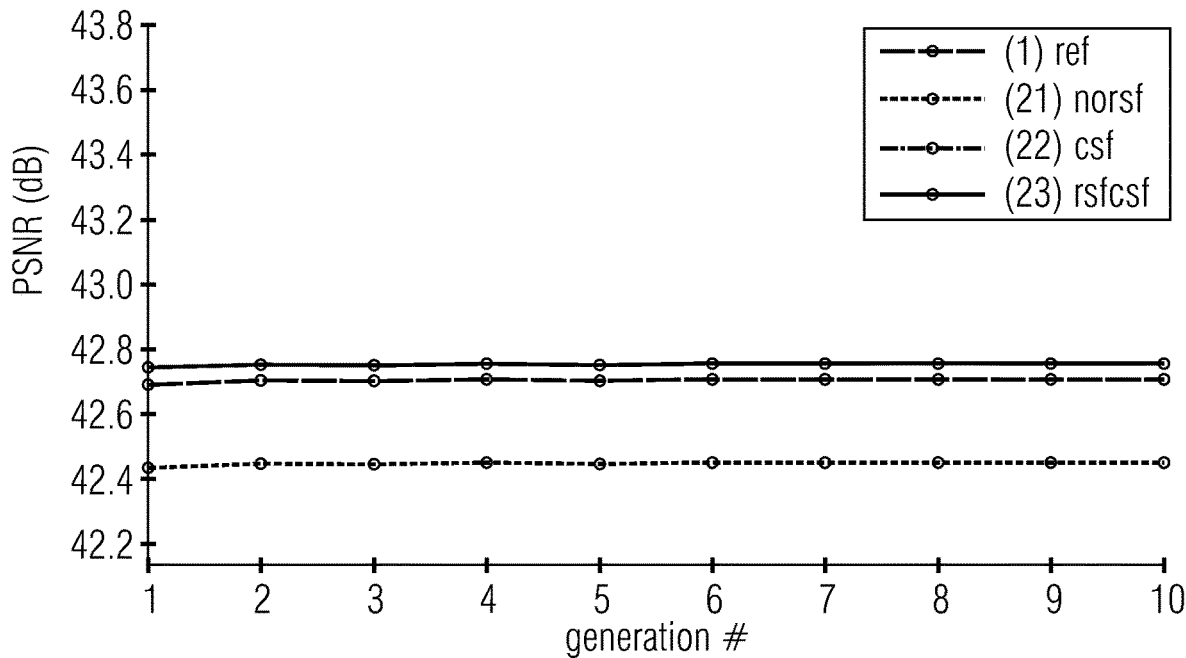
Fig. 6.31
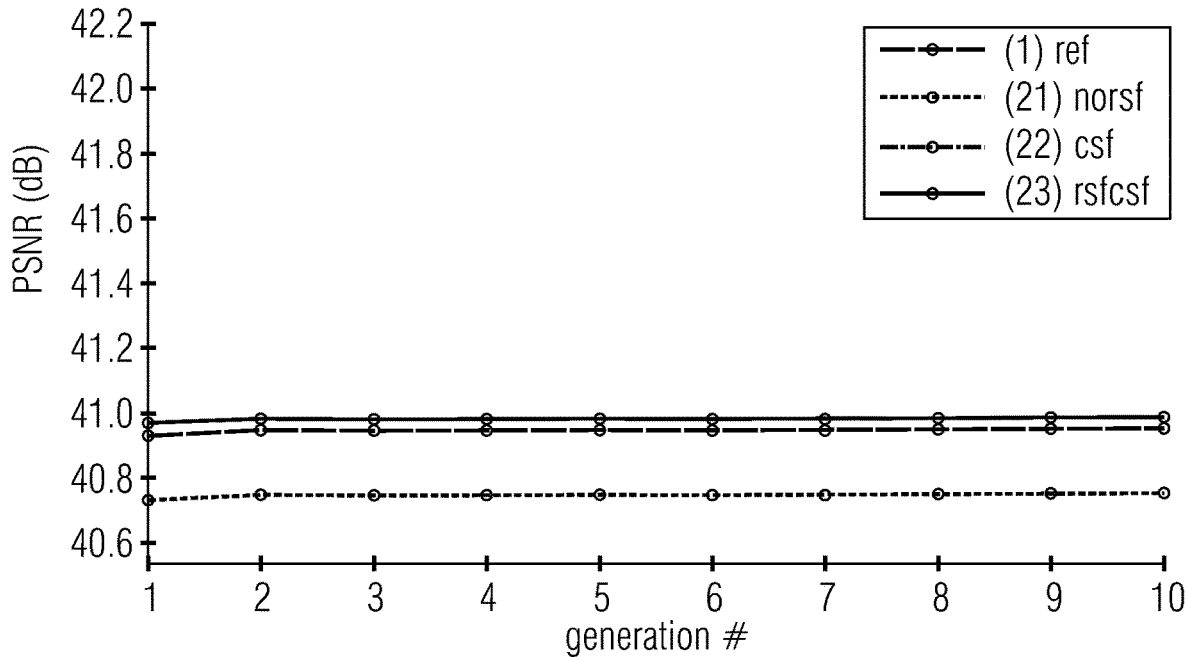
Fig. 6.32

| name | notes | size | values |
|---|---|---|---|
| unpack vertical( p,1) { | | | |
| for(b=0; b<$N_l$; b=b+1{ | Loop over all subbands of the precinct | | |
| if (I[b,l]) { | Include only if the band is present in the given line, see subclause B.5 | | |
| for(g=0;g<$N_{cg}$[p,b];g=g+1) { | Include predicted MSB positions for all coding groups, $N_{cg}$ is specified in subclause B.6. | | |
| t = max (T[p,b], $T_{top}$[p,b]) | | | |
| r = max ($M_{top}$[p,l,b,g],t) | Compute predictor | | |
| if (Fc[p] == 0 \|\| Z[p,l,b,⌊g/$S_s$⌋] == 0 { | Decode ΔMSB value only if either significance information was not included, or the corresponding significance group was signaled as significant | | |
| Δm=vlc(r,T[p,b]) | ΔMSB value encoded with variable length code | vlc | -31–31 |
| }else{ | | | |
| if(Rm == 0) { | Test the run mode | | |
| Δm=0 | Non-significant groups have a zero MSB prediction | | |
| }else{ | | | |
| Δm=T[p,b]-r | Non-significant groups have a zero MSB position | | |
| } | | | |
| } | end of significance included | | |
| m=r+Δm | Predict from r | | |
| if(m>T[p,b]) { | | | |
| M[p,l,b,g]=m | | | |
| }else{ | | | |
| M[p,l,b,g]=0 | Set insignificant if below or at trucation position | | |
| } | | | |
| } | end of loop over coding groups | | |
| } | end of line included | | |
| } | end of loop over subbands | | |
| Padding | pad to the next byte boundary | pad(δ) | 0 |
| } | | | |

BIT-PLANE CODING

CROSS-REFERENCE TO RELATED APPLICATIONS

This application is a continuation of copending International Patent Application No. PCT/EP2018/056122 filed Mar. 12, 2018, which claims priority from European Patent Application No. EP 17 180 617.7, which was filed on Jul. 10, 2017, and is incorporated herein in its entirety by reference.

The present application concerns bit-plane coding such as bit-plane picture coding for coding of still pictures and/or videos.

BACKGROUND OF THE INVENTION

In bit-plane coding, one seeks to try to reduce the coding amount by restricting the bit-planes coded to a fraction of the total amount of available bit-planes. Mostly, the bit-plane coding is performed on transform coefficients, i.e. coefficients of a transform of the actual data to be coded such as a spectral decomposition transform of a picture. Such a transform already "condenses" the overall signal energy into a smaller amount of samples, namely transform coefficients, and results in neighboring transform coefficients sharing similar statistics as far as the position of the most significant bit-plane among the available bit-planes is concerned, i.e. the most significant bit-plane having a non-zero bit in the respective transform coefficient. Accordingly, in the currently envisaged version of the upcoming JPEG XS, the transform coefficients representing a picture are coded in units of groups of transform coefficients with the datastream spending a syntax element per transform coefficient group which indicates the largest, i.e. most significant, bit-plane populated by the bits of the transform coefficients within that group, called GCLI, greatest coded line index. Alternative names are MSB Position or bitplane count. This GCLI value is coded in the datastream in a predictive manner such as using spatial prediction from neighboring transform coefficient groups. Such GCLI groups, in turn, are grouped into SIG groups and for each such SIG group of GCLI groups, a flag is spent in the datastream signaling the case where the prediction residual coded for the GCLI values is all zero for all the GCLI groups within an SIG group. If such a flag signals that all prediction residuals for GCLI are zero within an SIG group, no GCLI prediction residuals need to be transmitted and bitrate is saved.

However, there is still an ongoing wish to improve the coding efficiency of the just-outlined bit-plane concept in terms of, for instance, compression and/or coding complexity.

SUMMARY

According to an embodiment, a device may have: a decoder configured to decode transform coefficients from a data stream, the transform coefficients being grouped into coefficient groups, the coefficient groups being grouped into group sets, the decoder being configured to derive from the data stream an indication of a significance coding mode; derive from the data stream information which identifies a first subset of group sets for which a significance coding mode is not to be used, and a second subset of group sets for which the significance coding mode is to be used; for each group set out of the first subset, for each coefficient group of the respective group set, identify a first set of coded bit planes by deriving a first prediction for the first set of coded bit planes based on a first previously decoded coefficient group, correcting the first prediction using a first prediction residual derived from the data stream so as to acquire a corrected prediction for the first set of coded bit planes, deriving bits of the respective coefficient group within the corrected prediction for first set of coded bit planes from the data stream; if the significance coding mode is a first mode, for each group set out of the second subset, for each coefficient group of the respective group set, identify a second set of coded bit planes by deriving a second prediction for the second set of coded bit planes based on a second previously decoded coefficient group, and derive bits of the respective coefficient group within the prediction for the second set of coded bit planes from the data stream; and if the significance coding mode is a second mode, for each group set of the second subset, inherit that for each coefficient group of respective group set, coefficients of the respective coefficient group are insignificant.

According to another embodiment, a device may have: an encoder configured to encode transform coefficients into a data stream, the transform coefficients being grouped into coefficient groups, the coefficient groups being grouped into group sets, the encoder being configured to signal in the data stream a significance coding mode to be a first mode or a second mode, insert into the data stream information which identifies a first subset of group sets for which the significance coding mode is not to be used, and a second subset of group sets for which the significance coding mode is to be used; for each group set out of the first subset, for each coefficient group of the respective group set, identify a first set of coded bit planes in the data stream by deriving a first prediction for the first set of coded bit planes based on a first previously coded coefficient group, insert into the data stream a first prediction residual for correcting the first prediction so as to acquire a corrected prediction for the first set of coded bit planes, insert bits of the respective coefficient group within the corrected prediction for the first set of coded bit planes into the data stream; if the significance coding mode is the first mode, for each group set out of the second subset, for each coefficient group of the respective group set, identify a second set of coded bit planes by deriving a second prediction for the second set of coded bit planes based on a second previously coded coefficient group, and insert bits within the prediction for the second set of coded bit planes into the data stream; and wherein the significance coding mode being the second mode signals that, for each group set of the second subset, for each coefficient group of respective group set, coefficients of the respective coefficient group are insignificant.

According to another embodiment, a device may have: a decoder configured to decode transform coefficients from a data stream, the transform coefficients being grouped into coefficient groups, the coefficient groups being grouped into group sets, the decoder being configured to derive from the data stream information which identifies a first subset of group sets for which a significance coding mode is not to be used, and a second subset of group sets for which the significance coding mode is to be used; for each group set out of the first subset, for each coefficient group of the respective group set, identify a first set of coded bit planes by deriving a first prediction for the first set of coded bit planes based on a first previously decoded coefficient group, correcting the first prediction using a first prediction residual derived from the data stream so as to acquire a corrected prediction for the first set of coded bit planes, derive bits of the respective coefficient group within the corrected prediction for first set of coded bit planes from the data stream at a code rate of 1; for each group set of the second subset, inherit that for each coefficient group of respective group set, coefficients of the respective coefficient group are insignificant.

According to another embodiment, a device may have: an encoder configured to encode transform coefficients into a data stream, the transform coefficients being grouped into coefficient groups, the coefficient groups being grouped into group sets, the encoder being configured to insert into the data stream information which identifies a first subset of group sets for which the significance coding mode is not to be used, and a second subset of group sets for which the significance coding mode is to be used; for each group set out of the first subset, for each coefficient group of the respective group set, identify a first set of coded bit planes by deriving a first prediction for the first set of coded bit planes based on a first previously coded coefficient group, insert into the data stream a first prediction residual for correcting the first prediction so as to acquire a corrected prediction for the first set of coded bit planes, insert bits of the respective coefficient group within the corrected prediction for the first set of coded bit planes into the data stream at a code rate of 1, wherein, for each group set of the second subset, for each coefficient group of respective group set, coefficients of the respective coefficient group are insignificant.

According to an embodiment, a method for decoding transform coefficients from a data stream, the transform coefficients being grouped into coefficient groups, the coefficient groups being grouped into group sets, may have the steps of: deriving from the data stream an indication of a significance coding mode; deriving from the data stream information which identifies a first subset of group sets for which a significance coding mode is not to be used, and a second subset of group sets for which the significance coding mode is to be used; for each group set out of the first subset, for each coefficient group of the respective group set, identifying a first set of coded bit planes by: deriving a first prediction for the first set of coded bit planes based on a first previously decoded coefficient group, correcting the first prediction using a first prediction residual derived from the data stream so as to acquire a corrected prediction for the first set of coded bit planes, deriving bits of the respective coefficient group within the corrected prediction for first set of coded bit planes from the data stream; if the significance coding mode is a first mode, for each group set out of the second subset, for each coefficient group of the respective group set, identifying a second set of coded bit planes by deriving a second prediction for the second set of coded bit planes based on a second previously decoded coefficient group, and deriving bits of the respective coefficient group within the prediction for the second set of coded bit planes from the data stream; and if the significance coding mode is a second mode, for each group set of the second subset, inheriting that for each coefficient group of respective group set, coefficients of the respective coefficient group are insignificant.

According to an embodiment, a method for encoding transform coefficients into a data stream, the transform coefficients being grouped into coefficient groups, the coefficient groups being grouped into group sets, may have the steps of: signaling in the data stream a significance coding mode to be a first mode or a second mode, inserting into the data stream information which identifies a first subset of group sets for which the significance coding mode is not to be used, and a second subset of group sets for which the significance coding mode is to be used; for each group set out of the first subset, for each coefficient group of the respective group set, identifying a first set of coded bit planes in the data stream by deriving a first prediction for the first set of coded bit planes based on a first previously coded coefficient group, inserting into the data stream a first prediction residual for correcting the first prediction so as to acquire a corrected prediction for the first set of coded bit planes, inserting bits of the respective coefficient group within the corrected prediction for the first set of coded bit planes into the data stream; if the significance coding mode is the first mode, for each group set out of the second subset, for each coefficient group of the respective group set, identifying a second set of coded bit planes by: deriving a second prediction for the second set of coded bit planes based on a second previously coded coefficient group, and inserting bits within the prediction for the second set of coded bit planes into the data stream; and wherein the significance coding mode being the second mode signals that, for each group set of the second subset, for each coefficient group of respective group set, coefficients of the respective coefficient group are insignificant.

According to an embodiment, a method for decoding transform coefficients from a data stream, the transform coefficients being grouped into coefficient groups, the coefficient groups being grouped into group sets, may have the steps of: deriving from the data stream information which identifies a first subset of group sets for which a significance coding mode is not to be used, and a second subset of group sets for which the significance coding mode is to be used; for each group set out of the first subset, for each coefficient group of the respective group set, identifying a first set of coded bit planes by: deriving a first prediction for the first set of coded bit planes based on a first previously decoded coefficient group, correcting the first prediction using a first prediction residual derived from the data stream so as to acquire a corrected prediction for the first set of coded bit planes, deriving bits of the respective coefficient group within the corrected prediction for first set of coded bit planes from the data stream at a code rate of 1; for each group set of the second subset, inheriting that for each coefficient group of respective group set, coefficients of the respective coefficient group are insignificant.

According to an embodiment, a method for encoding transform coefficients into a data stream, the transform coefficients being grouped into coefficient groups, the coefficient groups being grouped into group sets, may have the steps of: inserting into the data stream information which identifies a first subset of group sets for which the significance coding mode is not to be used, and a second subset of group sets for which the significance coding mode is to be used; for each group set out of the first subset, for each coefficient group of the respective group set, identifying a first set of coded bit planes by deriving a first prediction for the first set of coded bit planes based on a first previously coded coefficient group, insert into the data stream a first prediction residual for correcting the first prediction so as to acquire a corrected prediction for the first set of coded bit planes, inserting bits of the respective coefficient group within the corrected prediction for the first set of coded bit planes into the data stream at a code rate of 1, wherein, for each group set of the second subset, for each coefficient group of respective group set, coefficients of the respective coefficient group are insignificant.

An embodiment may have a data stream generated by a method for encoding transform coefficients into a data stream, the transform coefficients being grouped into coefficient groups, the coefficient groups being grouped into group sets, the method including: signaling in the data stream a significance coding mode to be a first mode or a second mode, inserting into the data stream information which identifies a first subset of group sets for which the significance coding mode is not to be used, and a second subset of group sets for which the significance coding mode is to be used; for each group set out of the first subset, for each coefficient group of the respective group set, identifying a first set of coded bit planes in the data stream by: deriving a first prediction for the first set of coded bit planes based on a first previously coded coefficient group, inserting into the data stream a first prediction residual for correcting the first prediction so as to acquire a corrected prediction for the first set of coded bit planes, inserting bits of the respective coefficient group within the corrected prediction for the first set of coded bit planes into the data stream; if the significance coding mode is the first mode, for each group set out of the second subset, for each coefficient group of the respective group set, identifying a second set of coded bit planes by: deriving a second prediction for the second set of coded bit planes based on a second previously coded coefficient group, and inserting bits within the prediction for the second set of coded bit planes into the data stream; and wherein the significance coding mode being the second mode signals that, for each group set of the second subset, for each coefficient group of respective group set, coefficients of the respective coefficient group are insignificant.

Another embodiment may have a data stream generated by a method for encoding transform coefficients into a data stream, the transform coefficients being grouped into coefficient groups, the coefficient groups being grouped into group sets, the method including: inserting into the data stream information which identifies a first subset of group sets for which the significance coding mode is not to be used, and a second subset of group sets for which the significance coding mode is to be used; for each group set out of the first subset, for each coefficient group of the respective group set, identifying a first set of coded bit planes by: deriving a first prediction for the first set of coded bit planes based on a first previously coded coefficient group, insert into the data stream a first prediction residual for correcting the first prediction so as to acquire a corrected prediction for the first set of coded bit planes, inserting bits of the respective coefficient group within the corrected prediction for the first set of coded bit planes into the data stream at a code rate of 1, wherein, for each group set of the second subset, for each coefficient group of respective group set, coefficients of the respective coefficient group are insignificant.

Another embodiment may have a non-transitory digital storage medium having a computer program stored thereon to perform the method for decoding transform coefficients from a data stream, the transform coefficients being grouped into coefficient groups, the coefficient groups being grouped into group sets, the method including: deriving from the data stream an indication of a significance coding mode; deriving from the data stream information which identifies a first subset of group sets for which a significance coding mode is not to be used, and a second subset of group sets for which the significance coding mode is to be used; for each group set out of the first subset, for each coefficient group of the respective group set, identifying a first set of coded bit planes by: deriving a first prediction for the first set of coded bit planes based on a first previously decoded coefficient group, correcting the first prediction using a first prediction residual derived from the data stream so as to acquire a corrected prediction for the first set of coded bit planes, deriving bits of the respective coefficient group within the corrected prediction for first set of coded bit planes from the data stream; if the significance coding mode is a first mode, for each group set out of the second subset, for each coefficient group of the respective group set, identifying a second set of coded bit planes by deriving a second prediction for the second set of coded bit planes based on a second previously decoded coefficient group, and deriving bits of the respective coefficient group within the prediction for the second set of coded bit planes from the data stream; and if the significance coding mode is a second mode, for each group set of the second subset, inheriting that for each coefficient group of respective group set, coefficients of the respective coefficient group are insignificant, when said computer program is run by a computer.

Another embodiment may have a non-transitory digital storage medium having a computer program stored thereon to perform the method for decoding transform coefficients from a data stream, the transform coefficients being grouped into coefficient groups, the coefficient groups being grouped into group sets, the method including: deriving from the data stream information which identifies a first subset of group sets for which a significance coding mode is not to be used, and a second subset of group sets for which the significance coding mode is to be used; for each group set out of the first subset, for each coefficient group of the respective group set, identifying a first set of coded bit planes by: deriving a first prediction for the first set of coded bit planes based on a first previously decoded coefficient group, correcting the first prediction using a first prediction residual derived from the data stream so as to acquire a corrected prediction for the first set of coded bit planes, deriving bits of the respective coefficient group within the corrected prediction for first set of coded bit planes from the data stream at a code rate of 1; for each group set of the second subset, inheriting that for each coefficient group of respective group set, coefficients of the respective coefficient group are insignificant, when said computer program is run by a computer.

In accordance with a first aspect, the present application is based on a finding that a coding efficiency improvement may be achieved if bit-plane coding is performed in a manner so that coefficient groups for which the set of coded bit-planes is predictively signaled in the datastream, are grouped in two group sets and if a signal is spent in the datastream which signals, for a group set, whether the set of coded bit-planes of all coefficient groups of the respective group set are empty, i.e. all coefficients within the respective group sets are insignificant. By this measure, spending unnecessary bits for non-zero prediction residuals for coding the set of coded bit-planes for coefficient groups within a certain group set may be avoided in cases where, nevertheless, all the transform coefficients within all coefficient groups within the certain group set are insignificant, thereby tending to result in an improved compression. Beyond this, as far as the encoder is concerned, the determination whether transform coefficients are insignificant or not, i.e. whether the set of coded bit-planes, i.e. the non-zero bit-planes, are all beneath a quantization threshold, may be determined for each group set in parallel, i.e. independent from each other, thereby rendering easier a parallel implementation using the sort of group set-wise insignificant signalization.

In accordance with another aspect of the present application, it has been found out that a coding efficiency improvement may be achieved if bit-plane coding with group-set-wise insignificant signalization according to the first aspect discussed above is provided as a coding option alternative relative to the signalization for group sets discussed in the introductory portion of the specification according to which it may be signaled for a group set that there is no coded prediction residual for the coded bit-planes for the claim groups within the respective group set. To this, in accordance with the second aspect, the datastream provides information which identifies a first subset of group sets for which a significance coding mode is not to be used and a second subset of group sets for which the significance coding mode is to be used. The first subset of group sets is coded "normally", i.e. the datastream provides prediction residuals for the coded bit-planes of the coefficient groups of such group set and, if significant, bits within the coded bit-planes are coded in the datastream. For the second subset of group sets, the datastream comprises an indication or specification of the significance coding mode. In other words, this indication or specification signals to the decoder as to how the second subset of group sets are to be treated or, differently speaking, as to how the identification of the second subset of group sets is to be interpreted. A first mode of the significance coding mode corresponds to the interpretation according to which the prediction residual for the coded bit-plane signalization for the coefficient groups within such group set is zero. To this end, in accordance with a first significance coding mode type, merely the prediction residual signalization for the coded bit-plane signalization is omitted for the second subset of group sets. If the significance coding mode is indicated to be a second mode, then the group sets of the second subset are treated as collections of insignificant coefficients. To this end, the decoder inherits that for each coefficient group of such a group set, its coefficients are insignificant. According to this second aspect, the encoder is provided with the opportunity to switch between both significance coding mode options and the encoder may exploit this freedom in order to select the coding mode leading to a higher coding efficiency. Beyond this, however, providing the datastream with the opportunity to let the decoder know as to which significance coding mode option has been used, provides the design of the encoder side with the opportunity to choose the significance coding mode option more suitable for the intended implementation of the encoder side. For instance, when there is a high interest in achieving higher parallelism, then the insignificance signalization mode, i.e. second mode, may be used, while the first mode may be used in case of a single-thread implementation of the encoder. That is, the encoder may be implemented to operate merely in one of both mode types, chosen to be adapted to the encoder's implementation. Favorably, decoder complexity does not significantly differ between both mode types of the significance coding mode.

BRIEF DESCRIPTION OF THE DRAWINGS

Embodiments of the present invention will be detailed subsequently referring to the appended drawings, in which:

FIGS. 6.1 to 6.32 show PSNR simulation results obtained by bit-plane coding using RSF, i.e. a coding mode signaling zero prediction residual for the coded bitplane signaling, CSF, a coding mode signaling all-zero insignificance for the related coefficients, or a combination thereof, i.e. the case where both coding modes are available for the encoder to switch therebetween;

FIG. 13 shows a pseudocode for illustrating an example for forming the datastream including an indication of RSF or CSF usage.

DETAILED DESCRIPTION OF THE INVENTION

The following description of embodiments of the present application starts with a brief presentation of the current status of the JPEG XS standardization process, i.e. a currently discussed version for JPEG XS, whereupon it is outlined as to how this version could be modified in order to end-up into embodiments of the present application. Thereinafter, these embodiments are broadened in order to result into further embodiments described separately, but including individual references to specific details discussed before.

Figure 1:
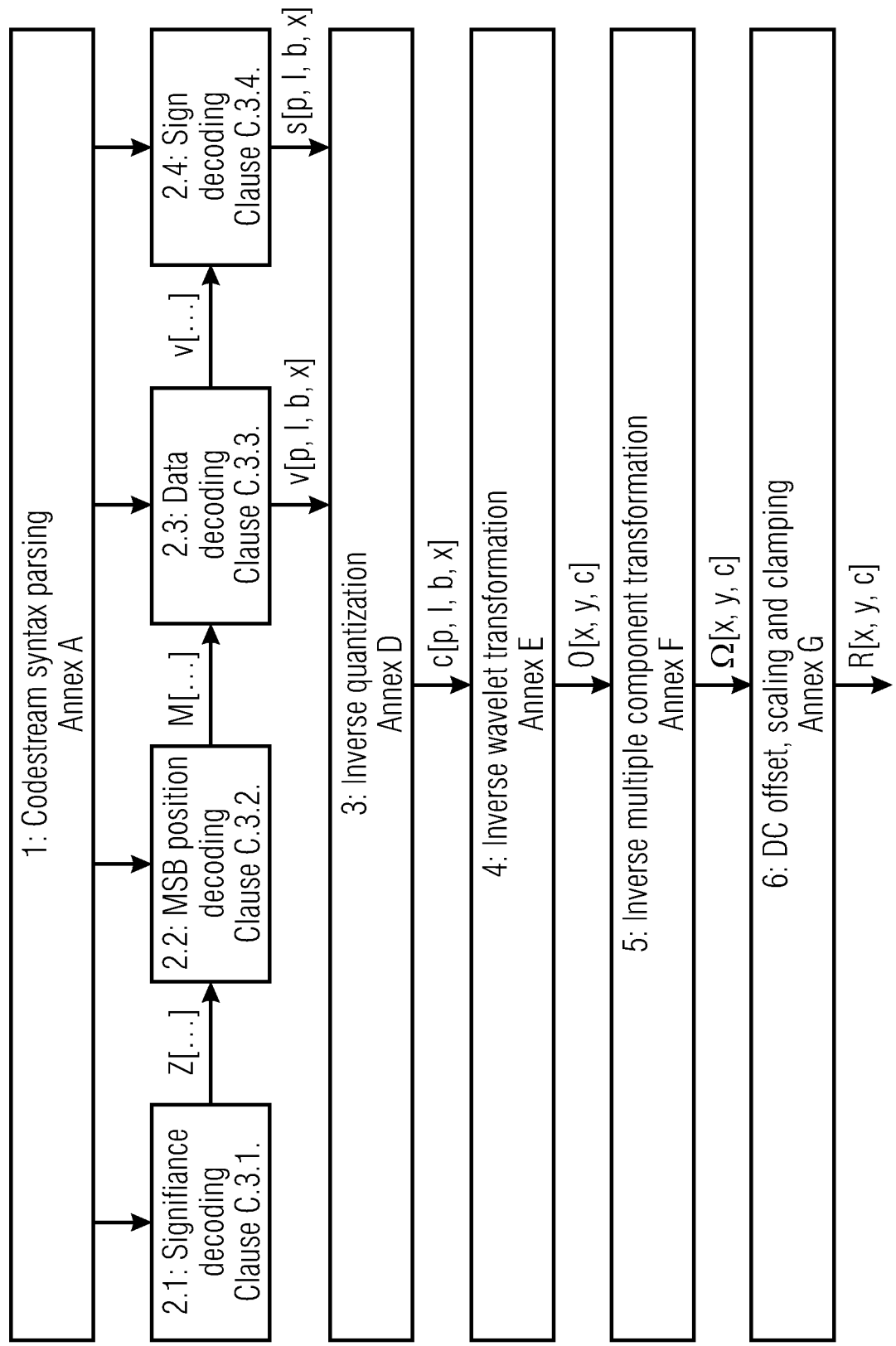
FIG. 1 shows a block diagram of a decoder operation of JPEG XS, as currently envisaged.

FIG. 1 provides an example of a decoding process currently envisaged for JPEG XS to which embodiments of the present application may be applied as described later on. As will become clear from the broadened embodiments described later, the present application is not limited to this kind of decoding process and the correspond coding process. Nevertheless, FIG. 1 assists the skilled reader in obtaining a better understanding of concepts of the present application.

According to FIG. 1, codestream decoding is grouped into a syntax analysis part in block 1, an entropy-decoding stage consisting of multiple blocks 2.1 to 2.4, an inverse quantization in block 3, an inverse wavelet transformation in block 4 and an inverse multiple component decorrelation in block 5. In block 6, sample values are scaled, a DC offset is added, and they are clamped to their nominal ranges.

In block 1, the decoder analyzes the codestream syntax and retrieves information on the layout of the sampling grid, and the dimensions of so-called slices and precincts.

Sub-packets of entropy-coded data segment of the codestream are then decoded to significant information, sign information, MSB position information (also called GCLI information) and, using all this information, wavelet coefficient data. This operation is performed in blocks 2.1 to 2.4 in FIG. 1.

Image and video compression typically applies a transform before running entropy coding. Reference [7], for instance, uses a block-based prediction, while reference [4],

[3], [5], [6] advocate for wavelet transforms. A wavelet is used in the case of FIG. 1, but again, FIG. 1 merely serves as an example and the same applies with respect to the usage of wavelet transform.

Figure 2:
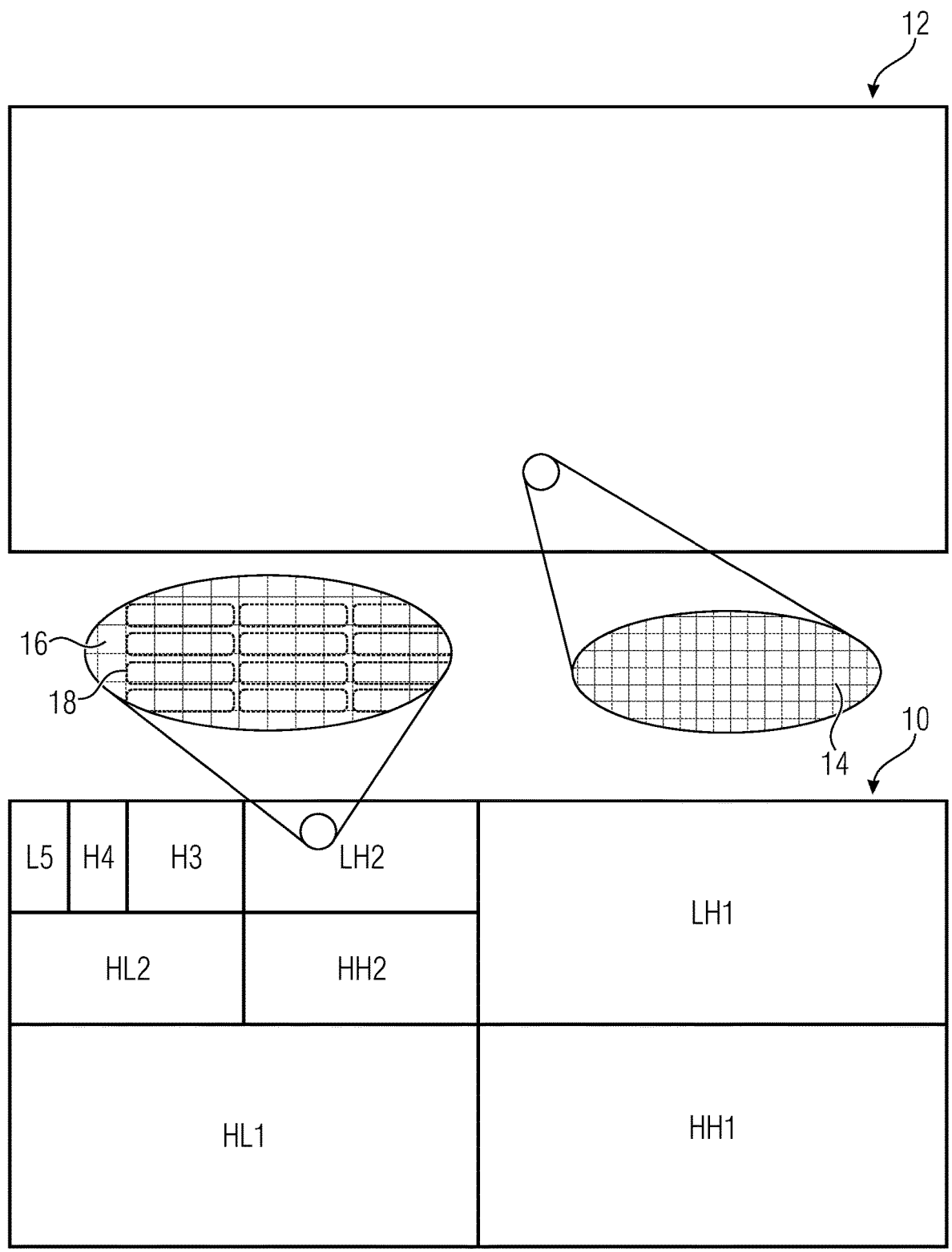
FIG. 2 shows a schematic diagram illustrating a decomposition of a picture 12 into transform coefficients using a wavelet transform as an example for the object of bit-plane coding, namely the transform coefficients.

Such a wavelet transform is depicted in FIG. 2. It decomposes an image into a number of subbands. Each subband represents a spatially down sampled and sub-band-specifically spectrally bandpass-filtered version of the picture 12. As depicted in FIG. 2, the number of horizontal decompositions might be different from the number of vertical decompositions. In each decomposition step, the low-pass subband of the previous decomposition is further decomposed. The L5 subband, for instance, represents a sub-sampled version of the image, while the other subbands contain the detail-information.

After the frequency transform, the coefficients of the subbands are entropy-coded. In other words, g≥1 coefficients of a subband ABm, with A, B∈{L, H}, m∈N, are arranged into a coefficient group. Then the most significant non-zero bit plane of the coefficient group is signaled, followed by the raw data bits. More details on the coding technique are explained in the following.

Figure 3:
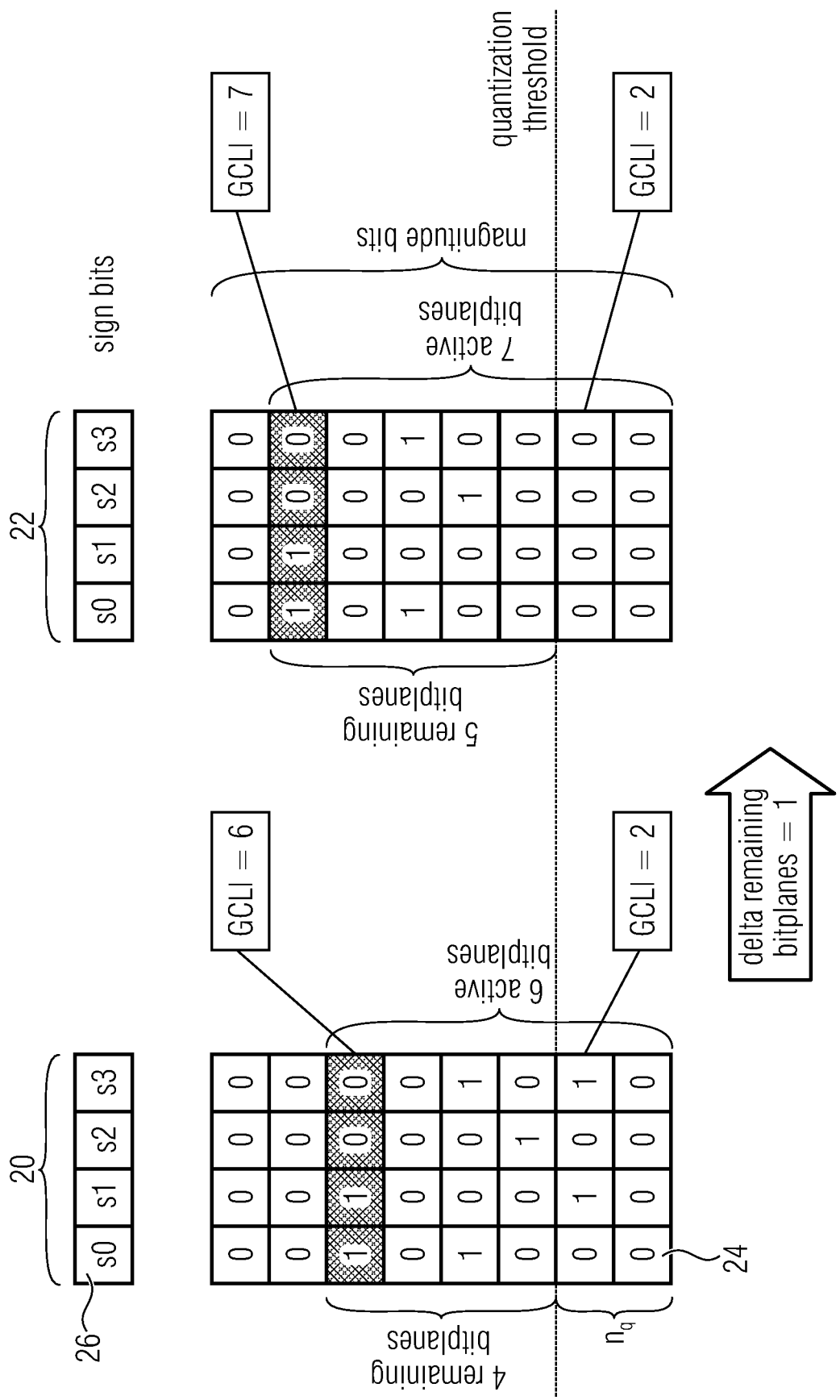
FIG. 3 shows a schematic diagram illustrating bit plane coding of transform coefficients in units of coefficient groups with using prediction-based coding of the set of coded bit planes by GCLI delta coding.

FIG. 3 illustrates the principle of GCLI coding which ends-up into syntax elements, the decoding of which, for instance, block 2.2 of FIG. 1 attends to. Hence, the GCLI coding is about coding the most significant bit positions and accordingly concerns the indication of the coded bit planes. This is done in the following manner. A number of coefficients which number is larger than 1, and with the coefficients belonging to the same subband of a frequency transform, are combined into a group which is, from now on, called a coefficient group. See, for instance, FIG. 2. The wavelet transform 10 depicted therein is an example for a transform of a picture 12. Again, a wavelet transform is merely an example for transforms for which embodiments of the present application would be applicable. Instead of coding the values of the samples or pixels 14 of picture 12 directly, the coding is performed on the transform coefficients 16 of transform 10. FIG. 3 assumes that a coefficient group is composed of four coefficients. The number is, however, chosen merely for illustration purposes and may be chosen differently. FIG. 2 illustrates that, for instance, such a coefficient group 18 comprises four spatially neighboring transform coefficients 16 all of which belong to the same subband of transform 10. FIG. 2 illustrates that the coefficients 16 comprised in one coefficient group 18 horizontally neighbor each other, but this is also merely an example and the grouping of coefficients 16 into coefficient groups 18 may be done differently. FIG. 3 illustrates the bit representation of each coefficient of a first coefficient group at the left-hand side at 20 and for a second coefficient group at 22. The bits of the absolute value of each coefficient are spread for each coefficient along a column. Accordingly, four columns are shown at 20 and 22, respectively. Each bit belongs to a certain bit plane wherein the lowest bit in FIG. 3 belongs to the least significant bit plane, while the upper most bits belong to the most significant bit plane. For illustration purposes, eight available bit planes are shown in FIG. 3, but the number may be different. In addition to the magnitude bits 24 of the transform coefficients, FIG. 3 shows for each coefficient a sign bit 26 above the corresponding magnitude bits. The GCLI coding is now explained with respect to FIG. 3 in more detail.

As already outlined, the coefficients are represented in sign-magnitude representation. The largest coefficient in a respective coefficient group determines the number of active bit planes for this coefficient group. A bit plane is called active, if at least one coefficient bit 24 of the bit plane itself or any higher bit plane (bit plane representing a larger number) is unequal to zero. The number of active bit planes is given by the so-called GCLI value, i.e. greatest coded line index. For coefficient group 20, for instance, the GCLI is 6 while for the second coefficient group 22, the GCLI is exemplarily 7. A GCLI value of 0 would mean that no bit planes are active, and hence the complete coefficient group would be 0. This situation is known as insignificant GCLI, and significant GCLI vice-versa. In order to achieve compression, only the active bit planes are placed into the bitstream, i.e. are coded.

For lossy encoding, some of the bit planes need possibly to be truncated such that the number of bit planes transmitted for a coefficient group is smaller than the GCLI value. This truncation is specified by the so-called GTLI, i.e. the greatest trimmed line index. An alternative name is truncation position. A GTLI of zero corresponds to no truncation. A GTLI value of 1 means that the number of transmitted bit planes for a coefficient group is 1 less than the GCLI value. In other words, the GTLI defines the smallest bit plane position that is included in the bitstream. In case of a simple dead zone quantization scheme, the transmitted bit planes equal the bit planes of the coefficient group without the truncated bit planes. In case of more advanced quantization schemes, some information of the truncated bit planed can be "pushed" into the transmitted bit planes by modifying the quantization bins. More details can be found in [6].

Since for each coefficient the number of remaining bit planes equals the difference between the GCLI and the GTLI values, it gets obvious that coefficient groups whose GCLIs is smaller or equal to the GTLI value are not contained in the bit stream. In other words, no (data) bits 24 are conveyed in the bit stream for these coefficient groups. Their coefficients are insignificant.

The active bit planes remaining after truncation and quantization are called remaining bit planes in the following or, alternatively speaking, truncated GCLI. Moreover, the GTLI is also called truncation point in the following. When the remaining bit planes is zero, the GCLI is known as insignificant truncated GCLI.

These remaining bit planes are then transmitted as raw bits to the decoder. Block 2.3 in FIG. 1 assumes responsibility for deriving these bits from the bit stream. In order to enable correct decoding, the decoder needs to know, however, the GCLI value of every coefficient group 18. Together with the GTLI value, which is also signaled to the decoder, the decoder can infer the number of raw data bit planes that are in the bit stream.

The GCLI values themselves are signaled by a variable length code that represents the difference to the GCLI value of a previous coefficient group. This previous coefficient group can in principle be any coefficient group that the encoder has already encoded before. Hence, it can for instance be a horizontal or vertical neighbor group. The output from the prediction is the difference in the number of remaining bit planes between two coefficient groups, leading to a delta remaining bit planes. FIG. 3, for instance, assumes that the left-hand coefficient group depicted at 20, precedes coefficient group 22 in coding order and its GCLI serves as a predictor for the GCLI of coefficient group 22.

More details are described hereinafter. Please note that GCLI values being below the GTLI value are of no interest, since the coefficients are not contained in the bit stream in any case. Consequently, the prediction is performed in such a way that the decoder can infer whether the GCLI is greater than the GTLI, and if so, what is the value of the GCLI.

Please note that the method described below is agnostic to the transmission order of the different bit stream parts. For instance, it is possible to first place the GCLI coefficients of all subbands into the bit stream, followed by the data bits of all subbands. Alternatively, GCLI and data bits might be interleaved in the datastream.

Figure 4:
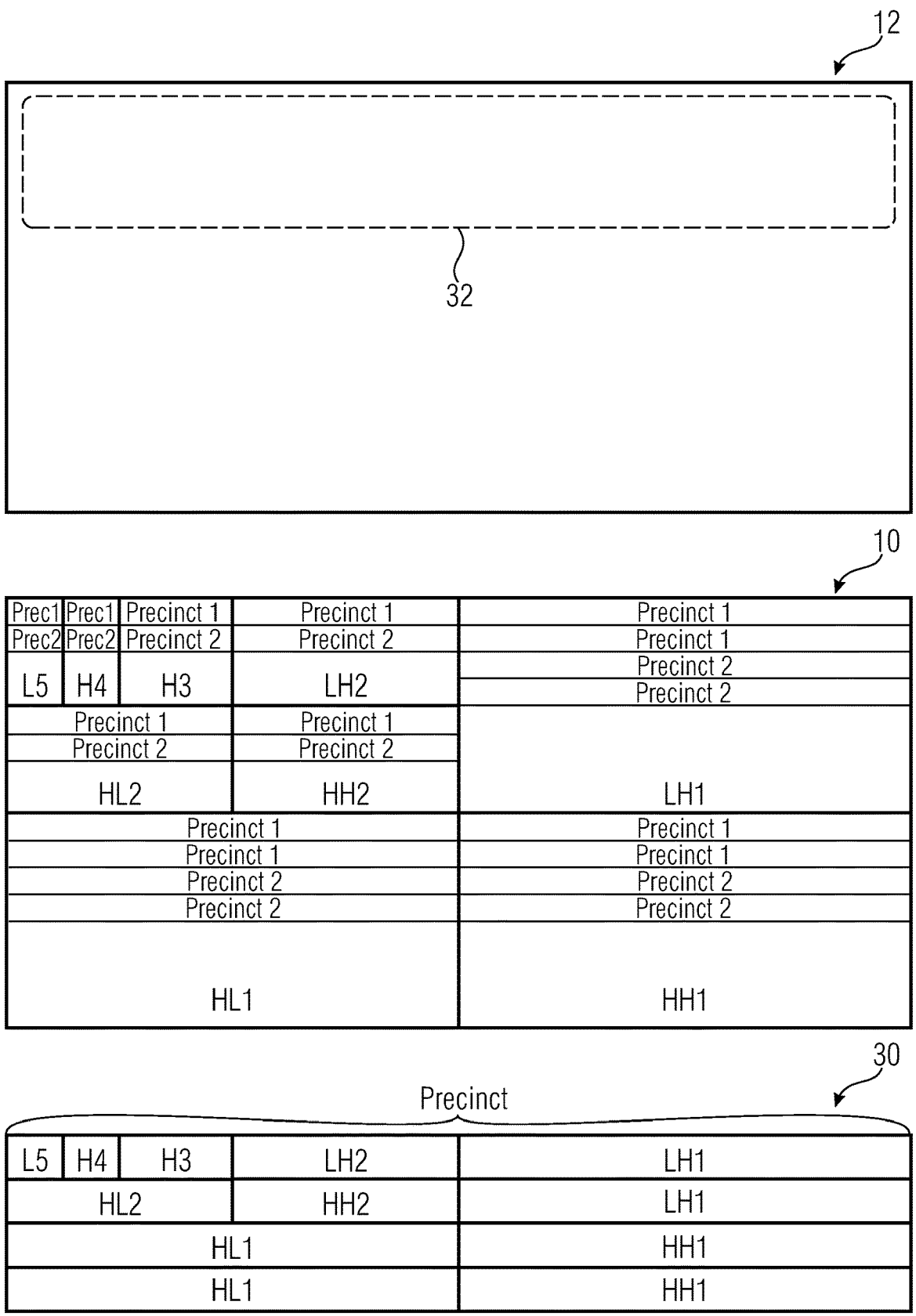
FIG. 4 shows a schematic diagram illustrating a subdivision of a wavelet transform into precincts.

Coefficients of the frequency transform depicted in FIG. 2 are organized in so-called precincts 30. This is depicted in FIG. 4. Precincts group coefficients of different subbands contributing to a given spatial region 32 of the input image 12.

In order to enable the decoder to recover the signal, it should know that GCLI value for every coefficient group 18. According to [3], different methods are available to signal them efficiently.

In the RAW mode, the GCLI value is transmitted without any prediction.

Hence, let $F_1$ be the coefficient group to be encoded next. Then the GCLI value can be encoded by a fixed length codeword representing the value:

$$\max(GCLI(F_1) - GTLI(F_1), 0)$$

In a horizontal prediction, the symbol coded is the difference between the GCLI value and the value of the GCLI previously coded belonging to the same line and the same wavelet subband, and considering the GTLI. This difference value is called residual or $\delta$ value in the following.

Let $F_1$ and $F_2$ be two horizontally neighbored coefficient groups, consisting of $g>1$ coefficients. Let $F_2$ be the coefficient group to be currently coded. Then GCLI($F_2$) can be signaled to the decoder by transmitting a residual calculated as follows:

$$\delta = \begin{cases} \max(GCLI(F_2), GTLI(F_2)) - \\ \max(GCLI(F_1), GTLI(F_2)) & \text{if } GCLI(F_1) > GTLI(F_1) \\ \max(GCLI(F_2), GTLI(F_2)) - GTLI(F_2) & \text{otherwise} \end{cases}$$

The decoder recovers GCLI($F_2$) by computing $$GCLI'(F_2) = \delta + \begin{cases} \max(GCLI(F_1), GTLI(F_2)) & \text{if } GCLI(F_1) > GTLI(F_1) \\ GTLI(F_2) & \text{otherwise} \end{cases}$$

$$GCLI(F_2) = \begin{cases} GCLI'(F_2) & \text{if } GCLI'(F_2) > GTLI(F_2) \\ 0 & \text{otherwise} \end{cases}$$

Please note that in horizontal prediction, typically GTLI($F_1$)=GTLI($F_2$). Note furthermore that $\delta$ is transmitted as a variable length code, as described in [4].

In a vertical prediction between two subband lines, the result is the difference between the GCLI value and the GCLI of the same subset of coefficients in the previously coded line.

Let $F_1$ and $F_2$ be two vertically neighbored coefficient groups, consisting of $g>1$ coefficients. Let $F_2$ be the coefficient group to be currently coded. Then, GCLI($F_2$) can be encoded in the same way than in a horizontal prediction.

Vertical prediction is restricted within a slice, which is a predefined set of contiguous lines (e.g. 64 lines). In this way, the first precinct of a slice cannot be vertically predicted.

An alternative way for vertical prediction is that instead of the prediction described above, the following prediction formula is used:

$$\delta = \max(GCLI(F_2), GTLI(F_2)) - \max(GCLI(F_1), GTLI(F_1))$$

Another alternative for vertical prediction is to use a so called bounded code:

$$\delta = \begin{cases} 2 \cdot (\tilde{g}_i - g_i^*) & \tilde{g}_i \geq g_i^* \wedge \tilde{g}_i \leq 2 \cdot g_i^* - t_i \\ 2 \cdot (g_i^* - \tilde{g}_i) - 1 & \tilde{g}_i < g_i^* \\ \tilde{g}_i - t_i & \text{otherwise} \end{cases}$$

with $$g_i^* = \max(\tilde{g}_i^r, t_i)$$

$$\tilde{g}_i = \max(g_i, t_i)$$

$$\tilde{g}_i^r = \max(g_i^r, t_i^r)$$

with
$g_i$ being the GCLI to encode
$g_i^r$ being the GCLI used as reference
$t_i$ being the truncation to apply for $g_i$
$t_i^r$ being the truncation that has been applied for $g_i^r$ Such a code has the property of $\delta \geq 0$, such that an efficient unary coding is possible.

The same prediction method can also be applied for $$g_i^* = \begin{cases} \max(\tilde{g}_i^r, t_i) & \tilde{g}_i^r > t_i^r \\ t_i & \text{otherwise} \end{cases}$$

In [1], escape codes have been used in the GCLI coding to signal a sequence of coefficient groups consisting of a plurality of coefficients all being smaller than a predefined truncation threshold. By these means, coding efficiency can be improved since multiple zero coefficient groups can be represented by one escape word instead of using a code word per coefficient group.

While this method has the advantage of not using any overheads in terms of significance flags, computing the additional bits compared to the bits that may be needed when not using any escape code induces some complexity. Moreover, some coding methods do not allow to use espace codes in an easy manner.

Figure 5:
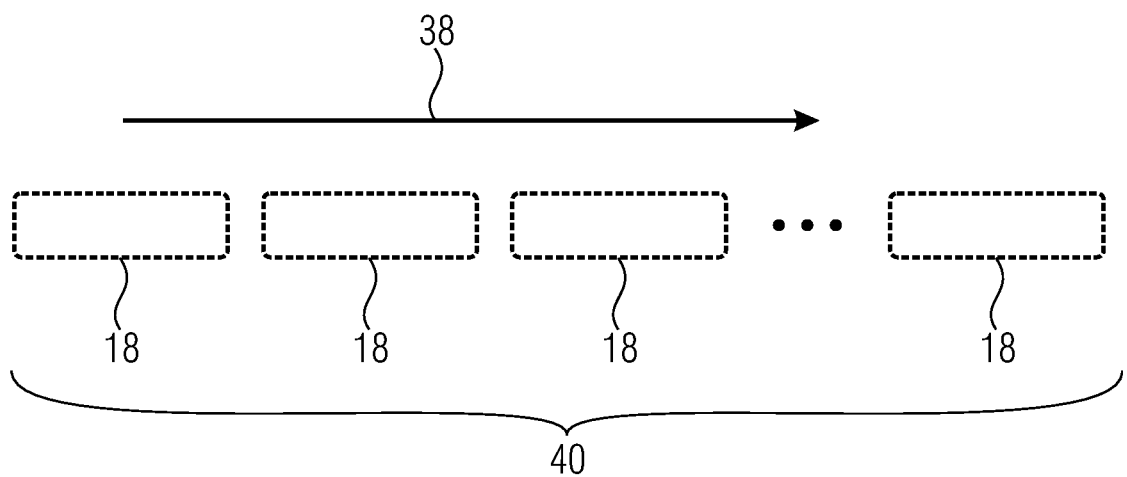
FIG. 5 shows a schematic diagram illustrating a composition of a group set out of coefficient groups in order to illustrate the significance coding mode.

See, for instance, FIG. 5 shows coefficient groups 18 that might be immediately consecutive with respect to the coding order 38 defined among the coefficient groups 18, but this is not mandatory. According to the just-mentioned escape coding, the GCLI value transmitted in the datastream for coefficient group 18 could signal, by way of assuming the escape code, that its coefficients as well as the coefficients of a number of subsequent coefficient groups 18, together forming a group set 40, are all insignificant. The question as to which coefficient groups 18 belong to group set 40 could be known by default or could be signaled. For example, when contiguous GCLI coefficient groups 18 have insignificant truncated GCLI values, they can be discarded from the codestream to improve coding efficiency by this means, for example. In this spatial zero runs method, this is done by means of coding escape values for the first coefficient in the group set 40 being insignificant. However, as just-indicated, spending such coding escape values increases the coding complexity and is, accordingly, not suitable for extreme low complexity cases.

According to the so-called RSF method taught in [1], the burden for coding the GCLI values is reduced by signaling for group sets such as group set 40 in FIG. 5, that the insignificant truncated GCLI values of the coefficient groups 18 are predicted from reference GCLI values leading, for all of them within group set 40, to residuals equal to 0. To this end, the coefficient groups 18 are grouped into group sets 40 and the datastream comprises for each group set 40 an RSF flag indicating whether the prediction residuals for the GCLI are all 0 within group set 40 in which case, naturally, no prediction residuals need to be transmitted in the datastream. However, RSF does not skip the coding of insignificant GCLIs when their corresponding residuals are not 0.

It might be that prediction residuals for the GCLIs of a set 40 are non-zero while, however, due to truncation, all the coefficients of all coefficient groups 18 within the respective group set 40 are insignificant.

definition of RSF. By introducing a new GCLI coding method, CSF dedicate also one flag to every SIG group 40, but they are set whenever the GCLIs of the coefficient groups 18 of the SIG group 40 are all insignificant after truncation, i.e. the set of coded bit planes for these coefficient groups 18 is empty. Hence, the same amount of flags than for RSF may be used. As described hereinafter, CSF coding may be combined with RSF coding in the sense that both may be used in accordance with alternative coding options so that it can be selected per precinct 30 or per subband, for instance. Here, the same flags in the data stream are interpreted to be RSFs or CSFs depending on some additional signalization in the data stream.

TABLE 1

Example of four exemplary SIG groups and indication of how RSF and CSF would bet set for these SIG groups

| SIG group | 0 | | | | 1 | | | | 2 | | | | 3 | | | |
|---|---|---|---|---|---|---|---|---|---|---|---|---|---|---|---|---|
| Predictor GCLIs | 6 | 2 | 5 | 7 | 5 | 6 | 5 | 8 | 4 | 5 | 2 | 5 | 5 | 6 | 6 | 7 |
| GCLI values | 5 | 4 | 2 | 3 | 5 | 6 | 5 | 8 | 0 | 0 | 0 | 2 | 5 | 5 | 6 | 8 |
| Truncated GCLIs (GTLI = 5) | 0 | 0 | 0 | 0 | 0 | 1 | 0 | 3 | 0 | 0 | 0 | 0 | 0 | 0 | 1 | 3 |
| Residuals | -1 | 0 | 0 | -2 | 0 | 0 | 0 | 0 | 0 | 0 | 0 | 0 | 0 | -1 | 0 | 1 |
| RSF | 0 | | | | 1 | | | | 1 | | | | 0 | | | |
| CSF | 1 | | | | 0 | | | | 1 | | | | 0 | | | |

The embodiments described below provide an opportunity to delete insignificant truncated GCLIs from the codestream by modifying the interpretation of RSF, allowing being complementary to the just-outlined RSF method at low complexity.

This is discussed in more detail in the following.

In the RSF method discussed in [1], GCLI coefficients are arranged into groups inside each subband, from now onwards called SIG groups. Element 40 in FIG. 5 is such an SIG group, for instance. The SIG group size might be 8 or any other number greater than 1. That is, a SIG group 40 may comprise two or more coefficient groups 18. While coefficient groups 18 comprised by one SIG group 40 may, as just-outlined, belong to one subband of the transform 10, this is not mandatory. Note that if the subband is not a multiple of a SIG group size such as 8, then the last coefficients might be treated as an incomplete group.

At the beginning of the codestream for a precinct 30, for example, a sequence of flags is signaled. Each flag corresponds to each SIG group 40 in the precinct. If the flag is set, then it means that all GCLI residuals corresponding to that group 40 are 0, and therefore, are not present in the codestream.

As mentioned before, there are situations in which the GCLIs of an SIG group are totally truncated (or simply 0), while their residuals are not 0. This can happen, for instance, when they are predicted vertically from a line or row in which the GCLIs are significant. Here, RSF do not succeed on preventing their residuals from being signaled, when in reality it might be advantageous, given that residuals different from 0 may use more budget for unary coding, for instance.

Thus, coefficient significance flags (CSF) are used in accordance with an embodiment of the present application instead of RSFs, thereby aiming at further extending the The table 1 shows an example and a comparison of CSF and RSF methods. For SIG group 0, CSF is selected since the truncated GCLI values are all 0, while RSF flag is not given that the residuals are not 0. For SIG group 1, the situation is the opposite. For SIG group 2, both GCLIs and residuals are 0 so that CSF would be one and RSF, too. And finally, in SIG group 3, neither of them is selected, i.e. RSF and CSF is set to zero.

In the following, the CSF variant is discussed further.

For example, the usage of CSF flags has an impact in that a budget saving per SIG group may be achieved.

Alphabets for unary coding typically dedicate 1 bit to signal a residual value of 0. Therefore, the budget saved by RSF is the same for every deleted SIG group, and equals exactly to the size of the group. On the other hand, the budget overhead introduced by the method is constant through the image, and equals to the amount of RSF that may be used.

Regarding CSF, the budget overhead is exactly equal than for RSF. But in contrast, the peak budget saving per SIG group is equal or larger than with RSF. Indeed, residuals removed by CSF can be equal or different to 0, so their budget can be greater or equal than the size of the group.

While RSF can be employed transparently to prediction, given that it is a post-processing (in encoder) or a pre-processing (in decoder), for CSF the prediction modules in decoder and encoder are slightly modified.

At the encoder, whenever a SIG group is found to contain only insignificant truncated GCLIs, then their coding can be completely skipped. However, the budget computation has to do more calculations in order to obtain the amount of bits saved by the residuals.

In the decoder, inverse prediction of those deleted GCLIs with CSF can be also skipped and replaced by 0 instead.

In the following, picture coding using CSFs as just-outlined is described in more details. To this end, some function definitions are used as follows.

Let α be a coefficient group to be encoded. Then

GCLI(α): Returns the GCLI value coefficient group a

PREF(α): Returns the coefficient group used for predicting the GCLI value of coefficient group α

GTLI(α): Returns the GTLI value to apply for coefficient group α. GTLI(α) thus depends on the precinct and subband of group α.

PRED($g_\alpha, t_\alpha, g_b, t_b$): Returns the residual corresponding to the prediction of GCLI $g_\alpha$ using as reference GCLI $g_b$, with GTLIs $t_\alpha$ and $t_b$ respectively.

PRED$^{-1}(\delta, t_\alpha, g_b, t_b)$: Returns the inverse prediction corresponding to coefficient group, using as reference GCLI $g_b$, residual δ, and with GTLIs $t_\alpha$ and $t_b$ respectively.

SIZE(s): Number of coefficient groups in one line of subband s.

SIGGRP(α): Returns the index of the SIG group to which the coefficient group α belongs.

CSF(g): Returns if the CSF flag associated to SIG group g. True means that the group is insignificant.

RSF(g): Returns if the RSF flag associated to SIG group g. True means that the group is insignificant.

SIGSIZE(s): SIG group size, which can be different per subband.

A pseudocode for managing CSF is provided below.

The decoding of GCLI values of a subband is done as follows.

When using CSF, the decoder can be described as stated below. For a subband s, the set of values GCLI($a_i$) for coefficient groups $a_i$ is decoded as follows:

```
for 0 ≤ i < SIZE(s)
    if CSF(SIGGRP(a_i))          # if STG flag is set, missing GCLI
        GCLI(a_i) ← 0
    else                          # otherwise, decode GCLI
        δ' = vlc_decode( )        # unary decode a delta value
        GCLI(a_i) ← PRED^-1 (δ', GTLI(a_i), GCLI(PREF(a_i)), GTLI(PREF(a_i)))
    end if
end for
```

The encoding of GCLI values of a subband is done as follows.

Let define the GTLI from which all GCLIs of a SIG group become insignificant, as follows:

$$GTLI_{csf}(g) = \max_{g=SIGGRP(a_i)}(GCLI(a_i)) = \max_{a_i \in g}(GCLI(a_i))$$

That is, the maximum GCLI value of the group. Thus, the encoding of coefficient groups $a_i$ of subband s can be performed as follows:

```
for 0 ≤ i < SIZE(s)
    if GTLI(a_i) ≥ GTLI_csf(SIGGRP(a_i)) # if insignificant truncated GCLI
        CSF(SIGGRP(a_i)) ← True # just update the flag, don't encode
    else                          # otherwise, encode
        encode(PRED (GCLI(a_i), GTLI(a_i), GCLI(PREF(a_i)), GTLI(PREF(a_i))))
        CSF(SIGGRP(a_i)) ← False
    end if
end for
```

Compared thereto, a pseudocode for managing RSF is provided below, as a reference.

First, the decoding of GCLI values of a subband is inspected.

When using RSF, the decoder can be described as stated below. For a subband s, the set of values GCLI($a_i$) for coefficient groups ($a_i$) is decoded as follows:

```
for 0 ≤ i < SIZE(s)
    if RSF(SIGGRP(a_i))          # if STG flag is set, missing
        GCLI δ' ← 0
    else                          # otherwise, decode GCLI
        δ' - vlc_decode( )        # unary decode a delta
    value
    end if
    GCLI(a_i) ← PRED^-1 (δ', GTLI(a_i), GCLI(PREF(a_i)), GTLI(PREF(a_i)))
end for
```

The encoding of GCLI values of a subband in case if using RSF is as follows.

Let define the GTLI from which all residuals of a SIG group become insignificant, as follows:

$$GTLI_{rsf}(g) = \max_{g=SIGGRP(a_j)} (\min\{T_j \mid \forall T \geq T_j: PRED(GCLI(a_j), T_j, GCLI(PREF(a_j)), GTLI(PREF(a_j))) = 0\})$$

Thus, the encoding of coefficient groups $a_1$ of subband s can be performed as follows:

```
for 0 ≤ i < SIZE(s)
    if GTLI(a_i) ≥ GTLI_rsf(SIGGRP(a_i))  # if insignificant truncated GCLI
        RSF(SIGGRP(a_i)) ← True   # just update the flag, don't encode
    Else                          # otherwise, encode
        encode(PRED (GCLI(a_i), GTLI(a_i), GCLI(PREF(a_i)), GTLI(PREF(a_i))))
        RSF(SIGGRP(a_i)) ← False
    end if
end for
```

A switching between coefficient and residual significance flags could be supported. As explained above, coefficient significance flags can indicate the presence of a sequence of coefficient groups (so called SIG group) that are zero after quantization, even when their prediction residuals are not zero. Placing the code words representing the prediction residuals into the bit stream can be avoided by setting the significance information or significance flag representing the sig group correspondingly, increasing thus the coding efficiency.

Residual significance flags, on the other hand, signal the presence of a quantized SIG group having all zero prediction residuals. In other words, in case all quantized coefficients of a SIG group have the same value than their predicted value, which might be different than zero, the zero prediction residuals do not need to be placed into the bit stream, when the corresponding significance bit(s) of the SIG group are set appropriately.

To this end, the bit stream of every precinct (or even every subband) signals which of the two significance flags is chosen. By these means, the encoder can chose for every precinct or every subband the best alternative, giving some coding gain as explained below.

FIGS. 6.1 to 6.32 present PSNR results which were obtained using the coding framework presented above, i.e. using the GCLI coding, combined with RSF coding, CSF coding or a variant allowing for a switching between both coding modes. FIGS. 6.1 to 6.6 refer to coding of RGB 444 8 bit, namely PSNR optimized with different bpp (bit per pixel) constraints for RSF/CSF switchability, visually optimized with bitrate constraint of 4 bpp while comparing RSF only, CSF only and RSF/CSF switching, respectively, PSNR optimized with bitrate constraint of 6 bpp while comparing RSF only, CSF only and RSF/CSF switching, respectively, PSNR optimized with bitrate constraint of 12 bpp while comparing RSF only, CSF only and RSF/CSF switching, respectively, visually optimized with bitrate constraint of 4 bpp while comparing RSF only, CSF only and RSF/CSF switching, respectively, and visually optimized with bitrate constraint of 12 bpp while comparing RSF only, CSF only and RSF/CSF switching, respectively. Similar simulation results are—as indicated at the headlines, depicted in FIGS. 6.7 to 6.10 for RGB 444 10 bit coding, and in FIGS. 6.11 to 6.14 for YUV 422 10 bit coding. Multigeneration maximum PSNR and mean PSNR results are presented in FIGS. 6.15 to 6.32, namely for RGB 444 8 bit in 6.15 to 6.20, for RGB 444 10 bit in 6.21 to 6.26, and for YUV 422 10 bit in FIGS. 6.27 to 6.32.

Figure 7:
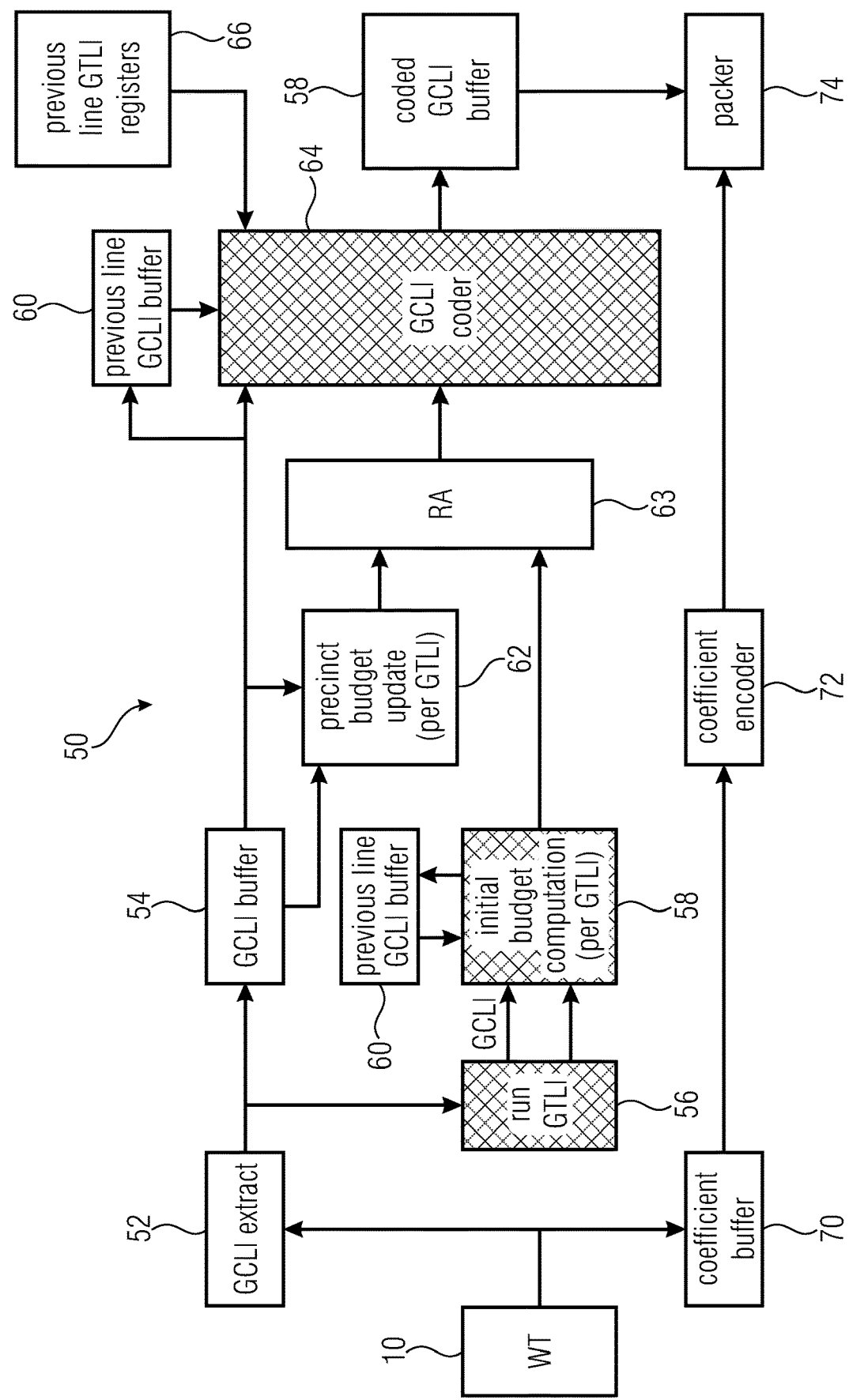
FIG. 7 shows a block diagram of an encoder according to an embodiment.

In the following, some complexity aspects are discussed in connection with CSF and RSF. Before, however, an encoder architecture is presented with respect to FIG. 7. The encoder is shown in FIG. 7 using reference sign 50 in a manner using, as a starting point, a wavelet transform 10 discussed previously. The wavelet transform 10 may have been obtained by a wavelet transformation by a transformer not shown in FIG. 7. In order to encode the wavelet transform 10, encoder 50 comprises a GCLI-extractor 52 which determines the greatest coded line index per coefficient group 18. The encoder 50 operates, for instance, precinct-wise and seeks to meet a certain bitrate constrained. The GCLI extractor 52 feeds the determined GCLI values into a GCLI buffer 54 and a run/GTLI module 56. Module 56 computes the smallest GTLI causing that all coefficient groups of a significant group are truncated to zero. More details are explained below. Module 56 forwards GCLI values and the smallest GTLI leading to an insignificant significant group to a subsequent budget computer 58 which computes a bit budget per GTLI candidate value. To this end, module 58 has access to, and keeps updated, for transform coefficient lines to be operated on next in coding order, the GCLI values of a previous transform coefficient line in a buffer 60. Because the exact budget depends on the GTLI of the previous precinct which might not be available already, module 58 only computes an initial approximation of the bit budgets per GTLI candidate. To be more precise, the budget computer 58 operates on a line of transform coefficients of the current precinct. A precinct budget updater 62 which is connected to the GCLI buffer 54 provides a precinct budget update. It corrects for any deviation between the previous budget approximation and the actual bit budget. To this end, module 62 operates on the precinct to encode next by module 64, causing that the GTLI of the previous precinct is already available. Based on the precinct budget update and budget values determined by computer 58, the RA module 63 computes the GTLI value to effectively apply to the precinct to encode next in order to meet the afore mentioned bitrate constraint. This GTLI value is provided as input to a GCLI coder 64 which, in addition, receives the GCLI values from the GCLI buffer 54. The GCLI coder 64 has access to the previous line of GCLI values in form of the previous line GCLI buffer 60 and to the GTLI of the previous line by way of a register 66. GCLI coder 64 codes the GCLI values with details in this regard having been set out above and outputs same into a buffer 68. The coefficients of the transform 10 are also buffered in a buffer 70 and those bits thereof which are in the coded bit planes as signaled in the data stream by way of the coded GCLI values in buffer 68, are inserted into the data stream via a coefficient encoder 72. As described above, this may be done in form of placing the bits as raw data into the data stream. A packer 74 packs the coded GCLI data and the raw data bits into the data stream.

The blocks in FIG. 7 highlighted, namely 56, 58 and 64, are concerned with the usage of two different types of significance flags, namely RSF and CSF. As further explained in [1] the content of which is incorporated herein by reference, the wavelet coefficients of the wavelet transform 10 are stored in the coefficient buffer 70 for later data coding by encoder 72. As also described in [1], the GCLI extractor 52 determines the GCLI value and stores it in buffer 54.

In order to combine the two different sigflags methods, the following values need to be computed per significance group such as by module 56:

$$t_i^{CSF} = \max_{s_{sig} \cdot i \leq j < s_{sig} \cdot (i+1)} (g_j)$$

$$t_i^{RSF} = \max_{s_{sig} \cdot i \leq j < s_{sig} \cdot (i+1)} (\min\{t_j \mid \forall t \geq t_j : PRED(g_j, t, g_i^r, t_j^r) = 0\})$$

With
$g_j$ being the GCLI j
$t_j$ being the quantization/truncation to apply to GCLI $g_j$
$g_i^r$ being the reference GCLI used for predicting $g_j$ (hence i.e. the horizontal or vertical neighbor)
$t_j^r$ being the quantization/truncation to apply to GCLI $g_i^r$
PRED being the prediction function to predict the value $g_j$ from $g_i^r$ using t and $t_j^r$
$S_{sig}$ being the currently processed significance group Given that $t_i^{RSF}$ is the same value than used in [2], the complexity is not further discussed. Computation of $t_i^{CSF}$ is possible by means of a comparator (<=5 LUTs) and one register of 4 bits per subband. Moreover, initial budget computation is simplified by delaying the GCLI values by one significance group. For one vertical wavelet decomposition level (3·8 subbands), this may be 3·8·8·4=768 bits. For Xilinx, this corresponds to 2·48=96 LUTs, or 2 MLAB blocks for Altera devices.

Another slight modification may be used in the GCLI coder: When only using the residual significance flags (as in [1]), $s_{sig}$ prediction residuals needs to be buffered before encoding them to determine whether all of them are zero. This allows to either output the prediction residuals or signaling the SIG group as insignificant by means of the significance flags. When using $t_i^{CSF}$, the coder has to check in addition whether all the GCLIs $g_i$ to encode are all below the selected quantization/truncation parameter $t_i$. This, however, is trivial, and no additional buffering is needed.

The computation of budget savings for coefficient significance flags is done as follows.

Whenever a significance group is signaled insignificant using the coefficient significance flags, the budget computation module in FIG. 7 needs to track the number of bits saved by not placing the prediction residuals into the bit stream.

The overall budget for both methods can hence be computed by

Computing the budget without any significance flags

Computing the budget savings for the residual significance flags

Computing the budget savings for the coefficient significance flags

This means that the complexity increase of using both methods just consists in computing an additional budget saving as discussed below.

Let's say vertical prediction according to the first option discussed above applies.

For this prediction method, the following equations are used $$\delta_i = \tilde{g}_i - \max(g_{i-1}, \max(t_{i-1}, t_i)) = \tilde{g}_i - \max(\tilde{g}_{i-1}, t_i)$$

$$\tilde{g}_i = \max(g_i, t_i)$$

$$\tilde{g}_{i-1} = \max(g_{i-1}, t_{i-1}) \quad (1)$$

In case both the current and the reference GTLIs $t_i$ and $t_{i-1}$ are equal, equation (1) simplifies to $$\delta_i = \tilde{g}_i - \max(g_{i-1}, \max(t_{i-1}, t_i)) = \tilde{g}_i - \tilde{g}_{i-1} \quad (2)$$

Knowing that the budget saving can only occur for $t_i \geq t_i^{CSF} \geq g_i$, we obtain from equation (1):

$$\delta_i = t_i - \max(g_{i-1}, \max(t_{i-1}, t_i))$$

The budget savings thus uniquely depends on $g_{i-1}$ and $t_i^{CSF}$, plus the parameters $t_{i-1}$ and $t_i$, such that it can be easily computed.

If the second vertical prediction option applies, the following equations are used $$\delta_i = \tilde{g}_i - g_{i-1}^* \quad (3)$$

$$g_{i-1}^* = \begin{cases} \max(g_{i-1}, t_i) & g_{i-1} > t_{i-1} \\ t_i & \text{otherwise} \end{cases}$$

$$\tilde{g}_i = \max(g_i, t_i)$$

$$\tilde{g}_{i-1} = \max(g_{i-1}, t_{i-1})$$

In case both the current and the reference GTLIs $t_i$ and $t_{i-1}$ are equal, equation (1) simplifies to $$\delta_i = \tilde{g}_i - \tilde{g}_{i-1} \quad (4)$$

Knowing that the budget saving can only occur for $t_i \geq t_i^{CSF} \geq g_i$, we obtain from equation (3):

$$g_i = t_i - \begin{cases} \max(g_{i-1}, t_i) & g_{i-1} > t_{i-1} \\ t_i & \text{otherwise} \end{cases}$$

The budget savings thus uniquely depends on $g_{i-1}$ and $t_i^{CSF}$, plus the parameters $t_{i-1}$ and $t_i$, such that it can be easily computed.

Figure 8:
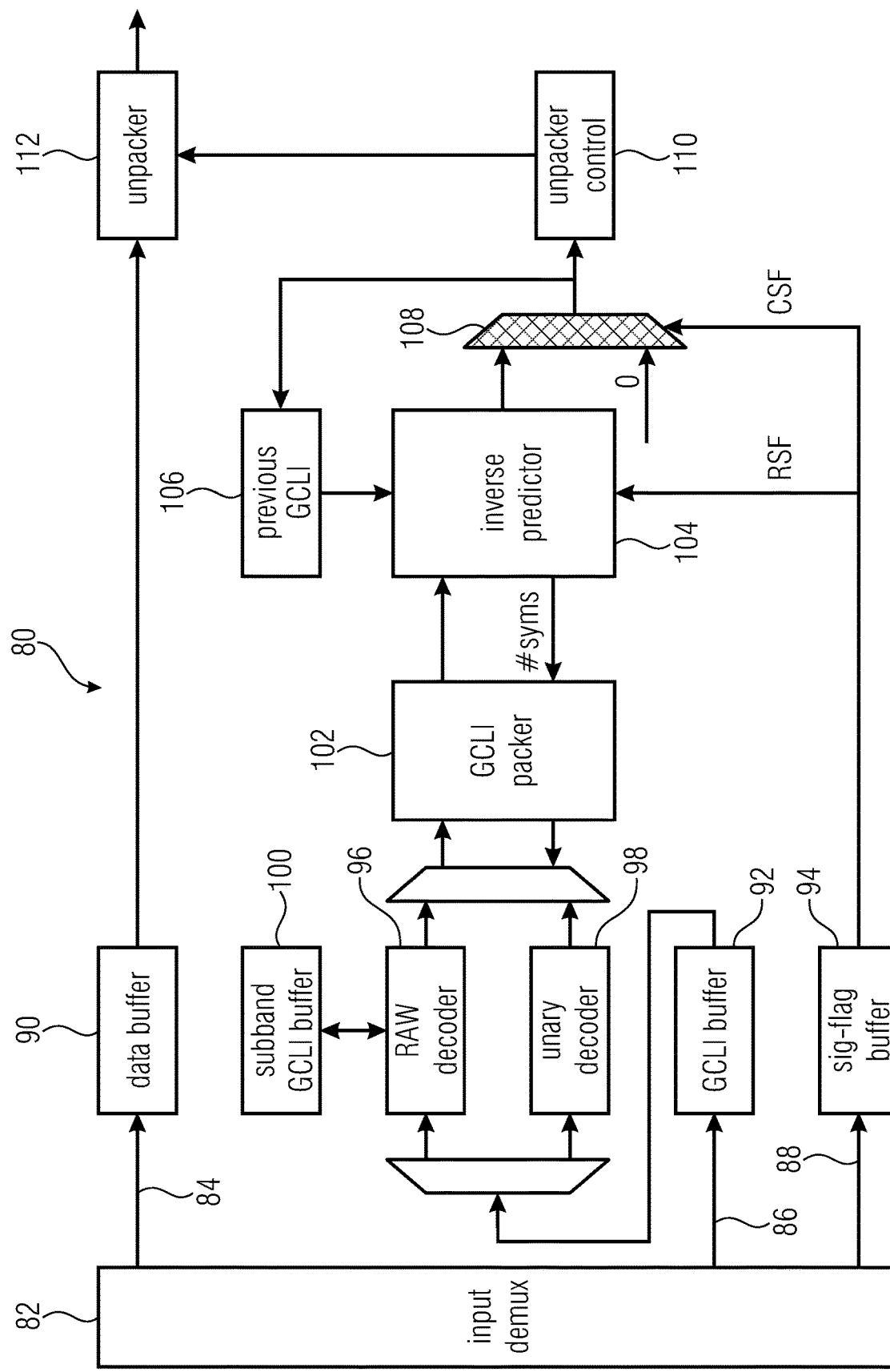
FIG. 8 shows a block diagram of a decoder in accordance with an embodiment.

A corresponding decoding architecture is shown in FIG. 8. The decoder of FIG. 8 is generally indicated using reference sign 80. An input demultiplexer 82 receives the datastream and derives therefrom the coded coefficient bits within the coded bit planes, namely 84, the GCLI residuals 86 and the flags which might be RSFs or CSFs, namely 88. The bits 84 are stored in the data buffer 90, the GCLI residual values in a GCLI buffer 92 and the flags 88 in buffer 94. As depicted in FIG. 8, the GCLI residual values stored in buffer 92 might be unary coded or coded as raw data and depending thereon, a raw decoder 96 or a unary decoder 98 is used to decode the GCLI residual values. A subband GCLI buffer 100 may, optionally, be accessible for decoder 96 and decoder 98, respectively. Via a GCLI packer 102, an inverse GCLI predictor 104 receives the GCLI residuals and reconstructs the GCLI values based on a previous GCLI 106 and on the basis of the RSF flag: if RSF applies, and the RSF flag for a current GCLI is set, inverse predictor 104 is informed on the prediction residual, i.e. the GCLI residual, being zero anyway. The predictor determined based on the previous GCLI 106 is then used as the current GCLI. The inverse predictor 104 outputs the GCLI determined and a multiplexer chooses this prediction output or a zero replacement depending on a CSF flag which applies for the current GCLI: if the CSF flag is set, there is no coded bitplane within the corresponding SIG group anyway and the GCLI is set accordingly, i.e. to zero or some value leading to insignificant transform coefficients coding considering the current GTLI. An unpacker controller 110 receives the output of the multiplexer 108 which, in turn, is also fed back as the previous GCLI to the inverse predictor 104, and controls, in turn, an unpacker 112 which, depending on the current GCLI, retrieves coefficient bits of coded bit planes for the current coefficient group from data buffer 90. At the output of unpacker 112, the respective transform coefficients result.

Accordingly, FIG. 8 shows a block diagram of a decoder and shows, in particular, extensions in addition to [1] which enable the support of both significance flag types. For sake of completeness, it should be noted that FIG. 8 shows an additional GCLI packer 102 compared to [1].

In case a precinct (or subband) is encoded with residual significance flags, the inverse predictor simply assumes a prediction residual of zero instead of reading them from the GCLI packer 102. When using the coefficient significance flags, the inverse predictor 104 can exactly perform the same operation. But instead of using the outcome of this prediction, the value is simply replaced by a zero value. Hence, in order to handle both flag types, the decoder of FIG. 8 simply comprises a 4 bit MUX2 element, namely 108, that is controlled by the output of the significance flag buffer 94 and the type of the significance flag used. The increase in logic as far as the decoder is concerned is, thus, negligible.

Figure 9:
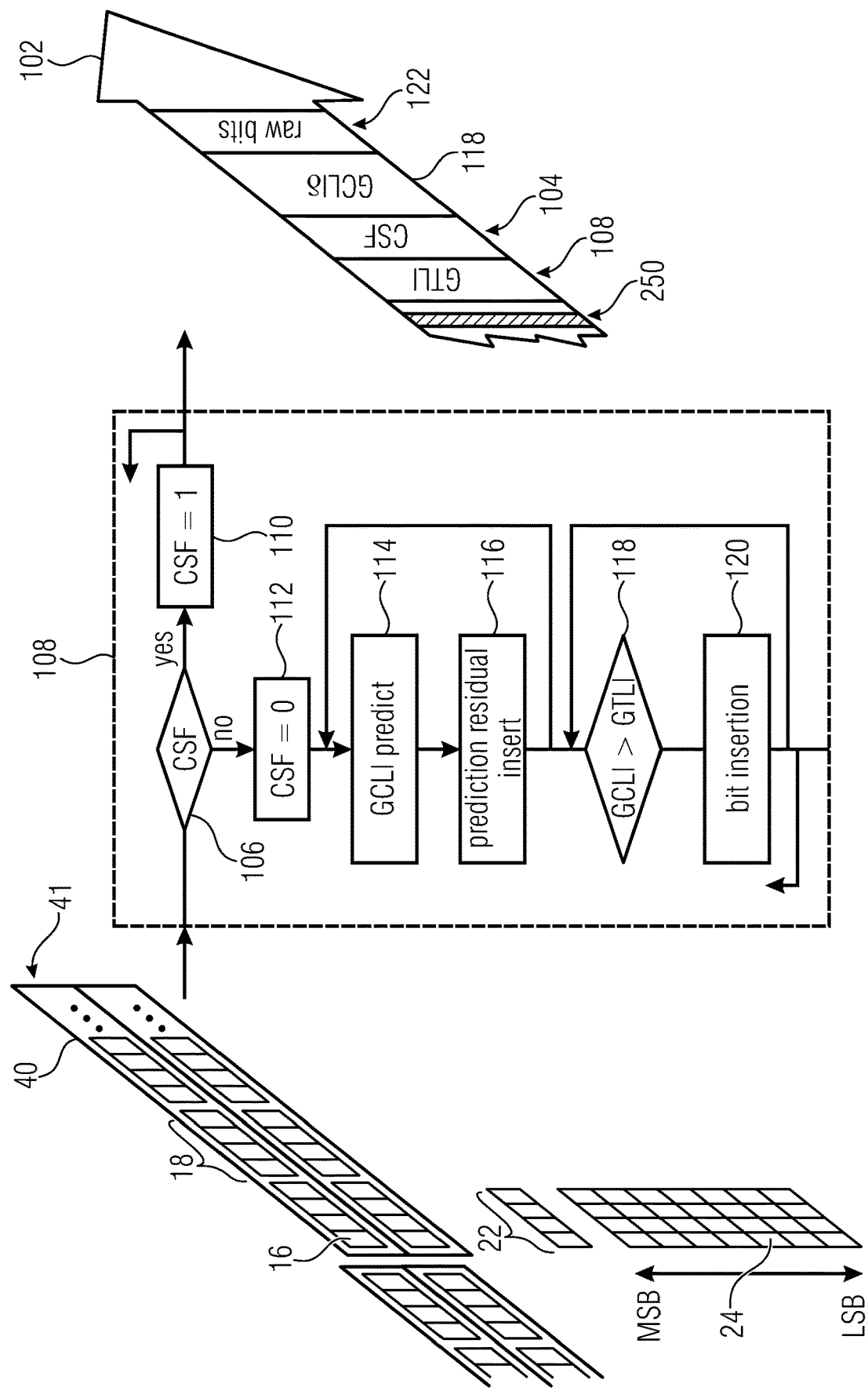
FIG. 9 shows an encoder in accordance with an embodiment, wherein the encoder uses CSF coding modes.

After having described certain embodiments of the present application as an extension or modification of the currently envisaged version of JPEG XS, further embodiments for decoder and encoder and datastream are described as a kind of generalization of the embodiments discussed above. FIG. 9 illustrates an encoder 100. The encoder of FIG. 9 is for encoding transform coefficients 16 into a datastream 102. As described above, the transform coefficients 16 may be transform coefficients of a transform of a picture. Transform coefficients 16 may form one sub-portion of a plurality of sub-portions of a spectral decomposition of a picture and the encoder 100 may be configured to perform the encoding on a per sub-portion basis. Such a sub-portion may be a subband such as a subband of a wavelet transform, or groups of transform coefficients relating to a corresponding spatial region of spatial regions in which the picture is subdivided such as the region 32 corresponding to a precinct. It should be clear that the transform coefficients 16 may also be coefficients of a different transform such as, for instance, a DCT or the like. The transform coefficients are grouped into coefficient groups 18. The number of coefficients 16 per group 18 may, as discussed above, be any number greater than 1 and is not restricted to 4 illustrated in FIG. 9. The grouping of coefficients 16 into groups 18 may be done in a manner so that coefficients 16 belonging to one group 18 belong to the same subband. In case of a wavelet transform, coefficients 16 belonging to one group 18 may, for instance, be spatial neighbors of one subband, and in case of transform coefficients 16 being DCT coefficients, a group 18 may be composed of coefficients 16 stemming from different DCT transform blocks obtained from spatially neighboring regions of a picture, the coefficients of one group corresponding to one frequency component or coefficient within these DCT transform blocks. In particular, in case of a DCT transform, a picture could be transformed in units of blocks into DCT transform blocks of the same size, each coefficient position of which would represent a separate subband. For example, all DC coefficients of these DCT transform blocks would represent the DC subband, the coefficients to the right thereof another subband and so forth. Groups 18 could then collect coefficients of one subband of DCT transform blocks obtained from neighboring blocks of the picture.

The coefficient groups 16, in turn, are grouped into group sets 40. This may also be done in a manner not mixing coefficients of different subbands. Moreover, coefficients 16 of coefficient groups 18 within one group set 40 may all stem from the same subband.

The encoder 100 of FIG. 9 inserts into the datastream 102 information 104 which identifies a first subset of group sets 40 for which a significance coding mode is not to be used, i.e. group sets 40 for which GCLI residuals are coded, and a second subset of group sets for which the significance coding mode is to be used, i.e. group sets 40 for which GCLI residuals are not coded. In the description brought forward above, one CSF flag is inserted into datastream 102 for each group set 40 in order to form information 104. The first subset of group sets 40 are the group sets 40 for which CSF is 0 or not set, while the second subset includes those group sets 40 for which CSF is 1. For setting information 104 for a current group set 40, encoder 100 checks 106 whether all transform coefficients 16 within group set 40 are insignificant, i.e. are quantized to 0. Encoder 100 may insert into datastream 102 truncation information 108 indicating a set of one or more truncated least significant bit planes. The GTLI value discussed above may form part of information 108. The GTLI 108 may be transmitted in datastream 102 at a granularity of the afore-mentioned sub-portions, for instance, i.e. per precinct, for instance, or at some other level such as in units of sub-bands or coefficient group rows. As a side, it is noted that the coefficient groups 18 may, other than exemplarily depicted in the figures, collect coefficients 16 neighboring each other along a direction oblique to the coefficient rows 41. The GCLI values for which the information 118 provides the prediction residuals, may indicate the most significant bit plane to be coded into data stream 102 as an index relative to the GTLI which may index, in turn, the most significant one among the least significant bit planes up to which the magnitude bits 24 shall be truncated. If all coefficients of all groups 18 within a current group set 40 are 0, the CSF flag for this group set 40 is set at 110, and if not, is not set as shown at 112. If not set, encoder 100 signals in the datastream 102 the set of coded bit planes by predicting this set at 114 on the basis of neighboring coefficient groups 18, for instance, and inserting 116 the prediction residual into the datastream 102, thereby forming the GCLI data 118 in datastream 102. For instance, the set of coded bit planes may be signaled in datastream 102 by indexing, i.e. by indexing the greatest coded line. For coefficient groups 18 within the current group set 40, for which the GCLI 118 is greater than the GTLI, encoder 100 encodes the corresponding coefficient bits of coefficients 16 of the respective coefficient group 18, i.e. bits 24, into datastream 102. This bit insertion 120 may be done at a code rate of 1 such as, more concretely speaking, by inserting the bits as raw bits. The GCLI data values, in turn, may be coded into datastream 102 as a variable length code, for instance, such as a unary code as discussed above. The raw bits inserted at 120 are depicted in FIG. 9 at 122. As already discussed above, within datastream 102, raw bits 122, GCLI data 118 and flags 104 may be interleaved or non-interleaved. As can be seen, CSF=1 is a very compressed way of representing group set 40. After any of 110 or 120, the processing may proceed with another group set 40 in the same manner.

Figure 10:
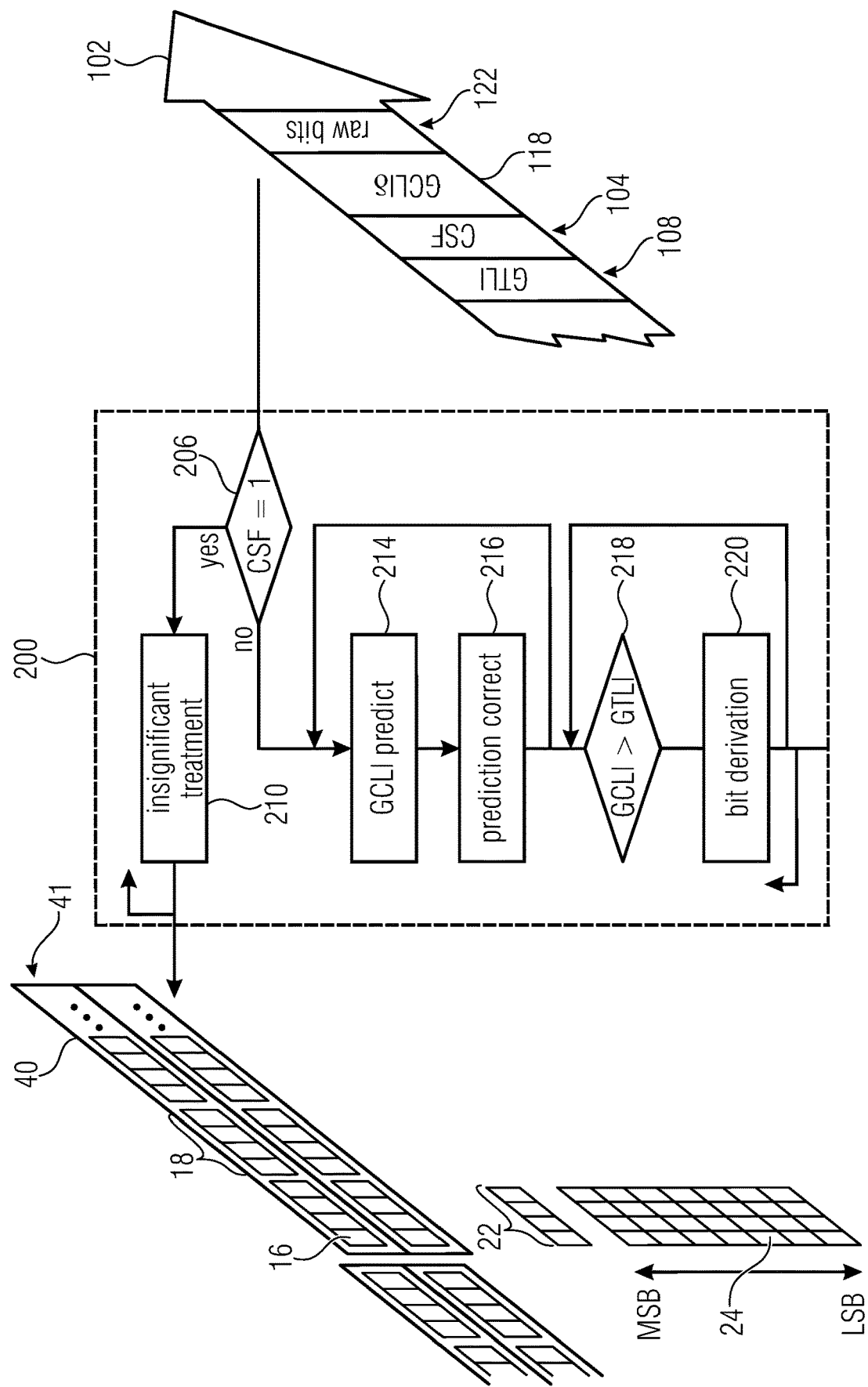
FIG. 10 shows a block diagram of a decoder fitting to the encoder of FIG. 9.

FIG. 10 shows a decoder corresponding to the encoder of FIG. 9. The decoder 200 of FIG. 10 operates to reconstruct the transform coefficients 16 from datastream 102 and to this end, checks whether the CSF for a current group set 40 is set in which case decoder 200 zeroes, i.e. sets to zero, all transform coefficients 16 within group set 40 or synthesizes noise in this transform coefficients 16. To this end, some sort of insignificant treatment 210 is performed for the current group set 40 if the check 206 indicates that significance coding mode is to be used for the current group set 40. If not, however, decoder 200 treats the group set 40 normally. That is, decoder 200 predicts at 214 the GCLI of each coefficient group 18 within the current group set 40 and corrects 216 the prediction using the prediction residual taken from datastream 102. As mentioned above, variable length decoding may use for deriving the prediction residual 118. The prediction may be done using the GCLI of a coefficient group 18 neighboring the current coefficient group or the current group 40 vertically, meaning in the present example, that for all groups 18 within the current set 40, the prediction reference, i.e. the vertically neighboring group 18 is external to current set 40. Alternatively, the prediction 214 may be done using the GCLI of a coefficient group 18 neighboring the current coefficient group or the current group 40 horizontally, meaning in the present example, that for most groups 18 within the current set 40 except the outermost left one, for instance, the prediction reference, i.e. the horizontally neighboring group 18, is within current set 40. Naturally, it might be feasible to signal the prediction source for each group 18 in the data stream. Even non-prediction might be a possible mode. The details on prediction 214 are naturally, also transferable, onto prediction 114. Mode switching may alternatively by signaled and selected by the encoder at some other granularity than groups 18 or sets 40, such as coefficient rows 41 or rows of groups 18, subbands or predincts 30.

For each coefficient group 18 for which the GCLI is greater than the GTLI, i.e. for which the set of coded bit planes is not beneath the quantization threshold, as checked by decoder 200 at 218, the bits of the corresponding coded bit planes of the coefficients 16 within the respective coefficient group 18 are read at 220 from datastream 102. This means, decoder 200 reads or decodes bits in datastream 102, namely 122, directly into those bit planes indicated by the GCLI and the GTLI, namely therebetween in accordance with a predetermined mapping rule for inserting the bits from bitstream 102 into the bit planes.

In FIG. 9, it is additionally illustrated that the encoder 100 may, optionally, signal within datastream 102 the fact that the information 104 pertains to this kind of significance indication, i.e. pertains to CSFs rather than, for instance RSFs. This indication is shown as being optionally inserted by encoder 100 into datastream 102 at 250.

Figure 11:
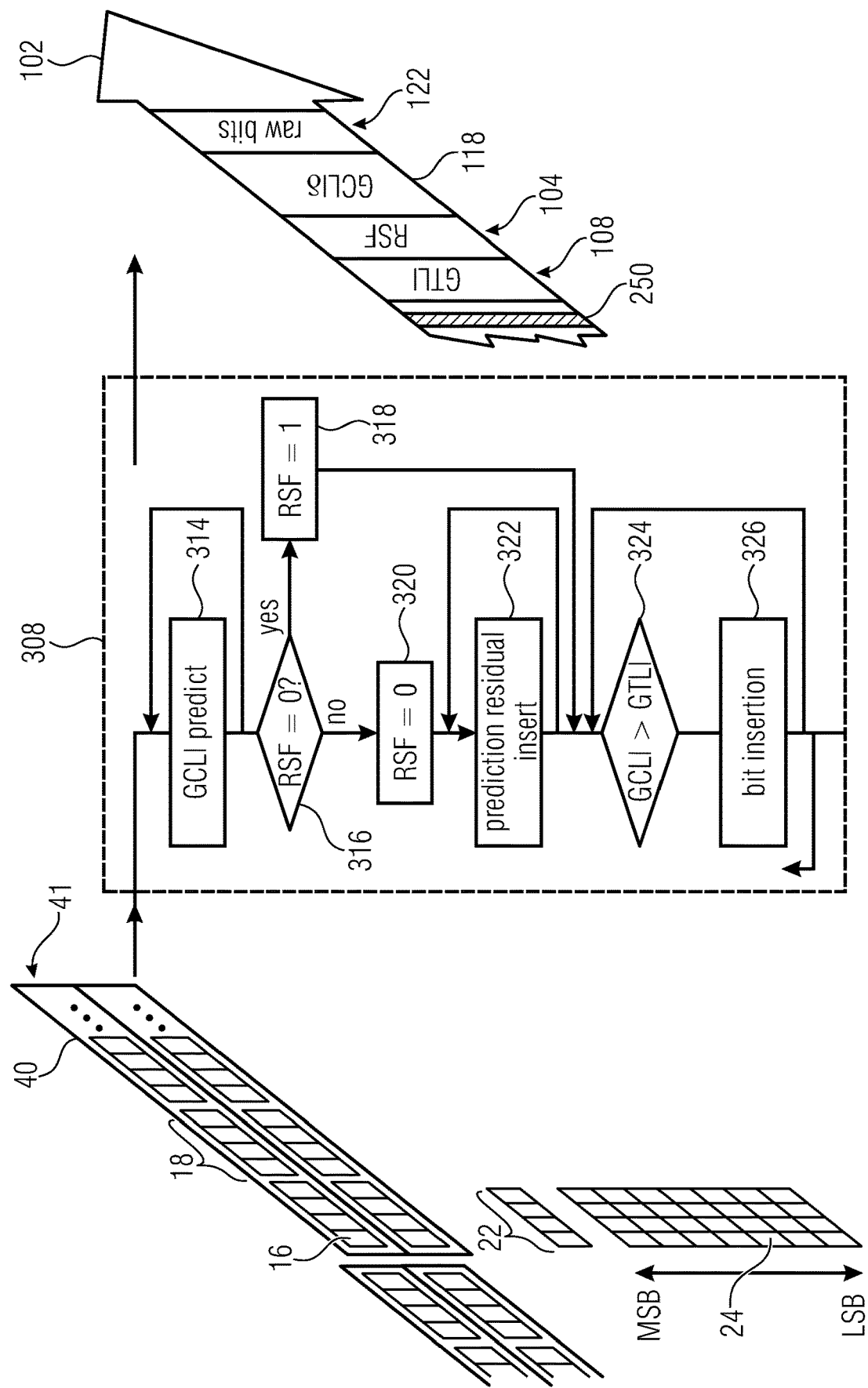
FIG. 11 shows a block diagram of an encoder using RSF coding mode with forming a datastream indicating RSF coding mode usage.

FIG. 11 shows an encoder 300 configured to use RSFs instead of CSF. The encoder 300 of FIG. 11 operates in the following manner. In particular, the following description concentrates on the differences to the operation of the encoder 100 of FIG. 9.

The encoder 300 of FIG. 11 operates on a current group set 40 by determining at 314 the GCLI predictors for all coefficient groups 18 of that group set 40 and determining at 316 whether all predictions exactly fit, i.e. the prediction residuals are all 0 for all coefficient groups 18 within group set 40. If this is the case, then encoder 300 signals this by setting RSF=1 at 318 within the significance information 104 in datastream 102. Here, indication 250 indicates that RSF signaling is conveyed in information field 104 of datastream 102 instead of CSF signaling as indicated by indication 250 in FIG. 9. If all the GCLI prediction residuals are not 0, however, then RSF flag for this group set 40 is set to 0 at 220 and the prediction residuals for the GCLI values for the coefficient groups 18 of the current group set 40 are inserted at 322 into datastream 102, namely within field 118. Irrespective whether RSF is set or not, it is checked whether non-truncated coded bit planes exist for each coefficient group, and if yes, they are inserted at 326 into datastream 102.

It should be noted that an encoder in accordance with a further embodiment could be able to operate according to both modes, i.e. according to FIG. 9 or according to FIG. 11 with choosing there among in order to decide as to which option, RSF or CSF, may be used according to some coding efficiency sense, for instance.

Figure 12:
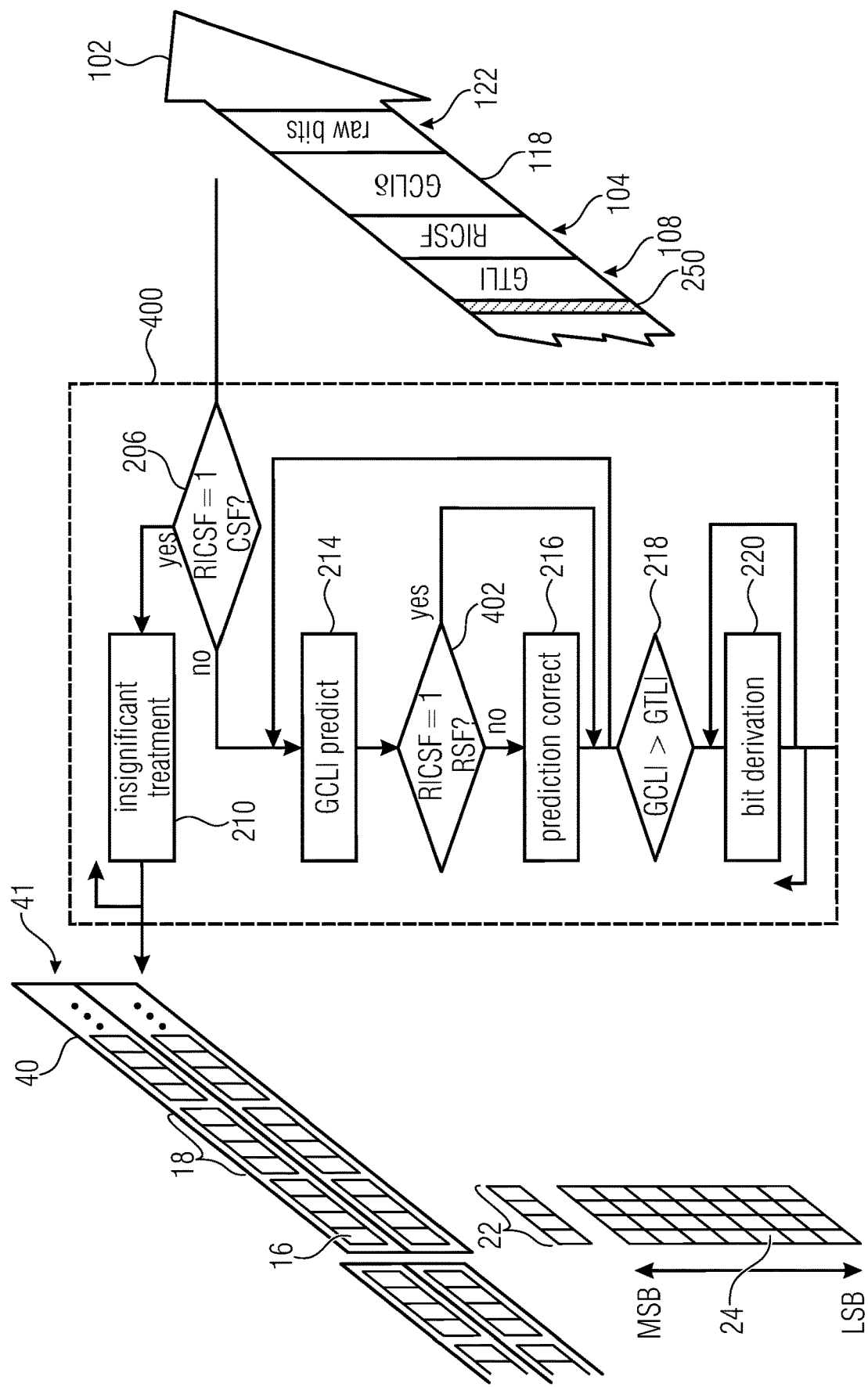
FIG. 12 shows a block diagram of a decoder capable of handling a datastream indicating by way of indication either one of CSF and RSF usage.

FIG. 12 shows a decoder 400 capable of dealing with a datastream 102 containing the indication 250 irrespective of whether indication 250 indicates the usage of CSF or RSF coding. The reference signs of FIG. 10 have been reused, but information 104 is indicated as "R/CSF" instead of "CSF" in order to indicate that the meaning of the flags of information 104 depends on indication 250. The insignificant treatment 210 is performed by decoder 400 merely in case of the corresponding flag for the current group set 40 being set and the CSF mode being indicated by indication 250, concurrently. If not, a further difference of the mode of operation compared to FIG. 10 is the fact that the prediction correction 216 is skipped by decoder 400 if a check 402 yields that the R/CSF flag is set for the current group set 40 and the indication 250 indicates the RSF mode. If not, the prediction correction 216 is performed.

With respect to FIG. 12, it is noted that it is remarkable that the decoder 400 of FIG. 12 does almost not differ from the decoder of FIG. 10. The capability of handling both, RSF and CSF coding, comes at almost no operational overhead. On the other hand, everybody seeking to install an encoder for generating a datastream 102 for feeding decoder 12, is, in case of indication 250 being used, provided with the opportunity to choose among the RSF option of FIG. 11, or the CSF option of FIG. 9. In this regard, it should be noted that the CSF option might have advantages with respect to parallel processing capability, while the RSF option of FIG. 11 might be advantageous in case of an implementation of the encoder in a sequential operation style such as, for instance, in form of an FPGA or the like. In particular, while the RSF setting depends on the prediction reference bases for the prediction in step 322, the CSF setting may be done independent from any other transform coefficients, except for the necessity to know about the GTLI, i.e. the quantization.

With respect to FIGS. 9 to 12, it should be noted that the data stream 102 could be provided by the encoder with information or a flag whether significance mode is used anyway, and depending thereon, information 104 and optionally used signaling 250 could be not present in data stream 102 with all group sets 40 being treated in normal mode instead.

DEFINITIONS & ABBREVIATIONS

These are some definitions that are going to be used along the document.

GCLI: Greatest Coded Line Index

GCLI Coefficient Group: Group of wavelet coefficient represented by one GCLI value Escape GCLI: GCLI value not used for ordinary coding that can be used to signal a specific condition to the decoder Significant GCLI: A GCLI whose value is larger than zero Insignificant GCLI: A GCLI whose value is zero GTLI: Greatest truncated line index Truncated GCLI: The result of max(GCLI-GTLI, 0)

Insignificant Truncated GCLI: A GCLI whose value is less or equal than the GTLI for a coefficient group GCLI residual: Result of the prediction applied to a GCLI value. This involves a reference GCLI and the corresponding GTLI values. There are two variants, horizontal and vertical prediction.

Precinct: Group of coefficients of different subbands contributing to a given spatial region in the input image.

Scenario: Quantization parameter defined on a precinct base that can be used to derive the GTLI values for the different wavelet subbands.

RSF: Residual Significance Flags, also known as Non significance Flags [1].

SIG group: Group of GCLI coefficient groups, for which a SIG flag is assigned. Also known as significance group CSF: Coefficient Significance Flags

REFERENCES

[1] EP17162866.2, Decoder for decoding image data from a data stream, encoder for encoding image data into a data stream, and data stream comprising image data and data on greatest coded line index values

[2] intoPIX, "intoPIX Codec Submission for JPEG-XS CfP, Design Description", wg1m73019

[3] AMBROISE RENAUD; BUYSSCHAERT CHARLES; PELLEGRIN PASCAL; ROUVROY GAEL, "Method and Device for display stream compression", EP2773122 A1

[4] AMBROISE RENAUD; BUYSSCHAERT CHARLES; PELLEGRIN PASCAL; ROUVROY GAEL, "Method and Device for Display Stream Compression", U.S. Pat. No. 9,332,258 BB

[5] Jean-Baptiste Lorent, "TICO Lightweight Codec Used in IP Networked or in SDI Infrastructure", SMPTE RDD 35:2016

[6] Toshiaki Kojima, "LLVC—Low Latency Video Codec for Network Transfer", SMPTE RDD 34:2015

[7] J. Kim and C. M. Kyung, "A Lossless Embedded Compression Using Significant Bit Truncation for HD Video Coding", IEEE Transactions on Circuits and Systems for Video Technology, 2010

FIG. 13 shows an example for a pseudocode of a datastream 102. In this pseudocode, the indication 250 is conveyed within a parameter called "Rm". Rm=1 indicates the usage of CSF coding mode and the skipping of any bit derivation is urged by synthetically setting the prediction residual Δm at 500 to such a value that the correction 502 of the GCLI predictor computed at 504 is in any case small enough in order to not exceed the quantization threshold T as tested at 506. The skipping of any GCLI residual reading from the datastream is done on the basis of the significance flag information at 508 by rendering the reading of any prediction residual, namely Δm, dependent on the significance flags Z. Whether or not Rm is 0 or 1, does not influence this dependency of the prediction residual reading at 510 on the significance flags at 508. If Rm is 0, i.e. RSF mode is active, the prediction residual Am is set to 0 at 512. The bit derivation of coded bit planes is not depicted in FIG. 13 but is merely done for transform coefficient groups for which M is greater than 0.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A decoder configured to decode transform coefficients from a data stream, the transform coefficients being grouped into coefficient groups, the coefficient groups being grouped into group sets, the decoder being configured to derive from the data stream an indication of a significance coding mode;

derive from the data stream information which identifies a first subset of group sets for which a significance coding mode is not to be used, and a second subset of group sets for which the significance coding mode is to be used;

for each group set out of the first subset, for each coefficient group of the respective group set, identify a first set of coded bit planes by deriving a first prediction for the first set of coded bit planes based on a first previously decoded coefficient group,
correcting the first prediction using a first prediction residual derived from the data stream so as to acquire a corrected prediction for the first set of coded bit planes,
deriving bits of the respective coefficient group within the corrected prediction for first set of coded bit planes from the data stream;
if the significance coding mode is a first mode, for each group set out of the second subset, for each coefficient group of the respective group set,
identify a second set of coded bit planes by deriving a second prediction for the second set of coded bit planes based on a second previously decoded coefficient group, and
derive bits of the respective coefficient group within the prediction for the second set of coded bit planes from the data stream; and
if the significance coding mode is a second mode, for each group set of the second subset,
inherit that for each coefficient group of respective group set, coefficients of the respective coefficient group are insignificant.

2. The decoder according to claim 1, wherein the transform coefficients form one sub-portion of a plurality of sub-portions of a spectral decomposition of a picture.

3. The decoder according to claim 2, wherein the decoder is configured to derive from the data stream the significance coding mode on a per sub-portion basis.

4. The decoder according to claim 3, wherein the sub-portions are sub-bands or groups of transform coefficients relating to a corresponding spatial region of spatial regions into which the picture is sub-divided.

5. The decoder according to claim 1, configured to derive from the data stream truncation information indicating a set of one or more truncated least significant bit planes for each coefficient group, and the first prediction, the corrected prediction and the second prediction indicate a most significant bit plane index relative to a most significant truncated bit plane of the set of one or more truncated least significant bit planes.

6. The decoder according to claim 5, configured to derive from the data stream the truncation information indicating the set of one or more truncated least significant bit planes at a granularity of coefficient group rows, sub-bands, or groups of transform coefficients relating to a corresponding spatial region of spatial regions into which the picture is sub-divided.

7. The decoder according to claim 1, wherein the transform coefficients are spectral coefficients of a spectral decomposition of a picture.

8. The decoder according to claim 1, wherein the transform coefficients are DCT or wavelet coefficients.

9. The decoder according to claim 1, wherein the transform coefficients are spectral coefficients of a spectral decomposition of a picture into sub-bands, and grouped into the coefficient groups in a manner so that transform coefficients within one coefficient group belong to the same sub-band.

10. The decoder according to claim 1, configured to derive the information from the data stream as one flag per group set, with group sets for which the flag assumes a first state, belonging to the first subset of group sets, and group sets for which the flag assumes a second state, belonging to the second subset of group sets.

11. The decoder according to claim 1, configured to perform the deriving of the bits at a code rate of 1.

12. The decoder according to claim 1, configured to set insignificant coefficients to zero or pseudo noise.

13. A method for decoding transform coefficients from a data stream, the transform coefficients being grouped into coefficient groups, the coefficient groups being grouped into group sets, the method comprising
deriving from the data stream an indication of a significance coding mode;
deriving from the data stream information which identifies a first subset of group sets for which a significance coding mode is not to be used, and a second subset of group sets for which the significance coding mode is to be used;
for each group set out of the first subset, for each coefficient group of the respective group set,
identifying a first set of coded bit planes by
deriving a first prediction for the first set of coded bit planes based on a first previously decoded coefficient group,
correcting the first prediction using a first prediction residual derived from the data stream so as to acquire a corrected prediction for the first set of coded bit planes,
deriving bits of the respective coefficient group within the corrected prediction for first set of coded bit planes from the data stream;
if the significance coding mode is a first mode, for each group set out of the second subset, for each coefficient group of the respective group set,
identifying a second set of coded bit planes by deriving a second prediction for the second set of coded bit planes based on a second previously decoded coefficient group, and
deriving bits of the respective coefficient group within the prediction for the second set of coded bit planes from the data stream; and
if the significance coding mode is a second mode, for each group set of the second subset,
inheriting that for each coefficient group of respective group set, coefficients of the respective coefficient group are insignificant.

14. A non-transitory digital storage medium having a computer program stored thereon to perform the method for decoding transform coefficients from a data stream, the transform coefficients being grouped into coefficient groups, the coefficient groups being grouped into group sets, the method comprising
deriving from the data stream an indication of a significance coding mode;
deriving from the data stream information which identifies a first subset of group sets for which a significance coding mode is not to be used, and a second subset of group sets for which the significance coding mode is to be used;
for each group set out of the first subset, for each coefficient group of the respective group set,
identifying a first set of coded bit planes by
deriving a first prediction for the first set of coded bit planes based on a first previously decoded coefficient group,
correcting the first prediction using a first prediction residual derived from the data stream so as to acquire a corrected prediction for the first set of coded bit planes, deriving bits of the respective coefficient group within the corrected prediction for first set of coded bit planes from the data stream;
if the significance coding mode is a first mode, for each group set out of the second subset, for each coefficient group of the respective group set,
    identifying a second set of coded bit planes by deriving a second prediction for the second set of coded bit planes based on a second previously decoded coefficient group, and
    deriving bits of the respective coefficient group within the prediction for the second set of coded bit planes from the data stream; and
if the significance coding mode is a second mode, for each group set of the second subset,
inheriting that for each coefficient group of respective group set, coefficients of the respective coefficient group are insignificant,
when said computer program is run by a computer.

\* \* \* \* \*